(12) United States Patent
Kim

(10) Patent No.: US 9,715,465 B2
(45) Date of Patent: Jul. 25, 2017

(54) STORAGE DEVICE AND OPERATING METHOD OF THE SAME

(71) Applicant: Samsung Electronics Co., Ltd., Suwon-si, Gyonggi-do (KR)

(72) Inventor: Seontaek Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/801,979

(22) Filed: Jul. 17, 2015

(65) Prior Publication Data

US 2016/0117119 A1    Apr. 28, 2016

(30) Foreign Application Priority Data

Oct. 28, 2014   (KR) ........................ 10-2014-0147260

(51) Int. Cl.
*G06F 13/14*    (2006.01)
*G06F 13/16*    (2006.01)

(52) U.S. Cl.
CPC ................................ *G06F 13/1642* (2013.01)

(58) Field of Classification Search
None
See application file for complete search history.

(56) References Cited

U.S. PATENT DOCUMENTS

| | | | |
|---|---|---|---|
| 5,889,947 A | 3/1999 | Starke | |
| 6,308,185 B1 | 10/2001 | Grarup et al. | |
| 7,110,359 B1 | 9/2006 | Acharya | |
| 7,251,704 B2 | 7/2007 | Solomon et al. | |
| 7,525,986 B2 | 4/2009 | Lee et al. | |
| 7,679,133 B2 | 3/2010 | Son et al. | |

(Continued)

FOREIGN PATENT DOCUMENTS

| | | |
|---|---|---|
| JP | 200047931 A | 2/2000 |
| KR | 19980063538 A | 7/1998 |

(Continued)

OTHER PUBLICATIONS

Amber Huffman, NVM Express, Sep. 23, 2013, Intel Corporation, Revision 1.1a, pp. 8-10, 44, 45, 60-62.*
NVM Express Revision 1.1a, Sep. 23, 2013.

*Primary Examiner* — Ilwoo Park
(74) *Attorney, Agent, or Firm* — Harness, Dickey & Pierce, P.L.C.

(57) ABSTRACT

An operating method of a storage device including a nonvolatile memory and a memory controller configured to control the nonvolatile memory may include selecting one of a plurality of submission queues; fetching, from the selected submission queue, a command for accessing the storage device; executing the fetched command; outputting an execution result of the fetched command to a selected completion queue corresponding to the selected submission queue; determining whether a submission queue is a full submission queue, the full submission queue corresponding to a full completion queue; and inhibiting the selecting from selecting the full submission queue until the full completion queue becomes a normal completion queue, when the determining determines a submission queue is the full submission queue, wherein the plurality of submission queues are sequentially selected in accordance with round robin scheduling.

14 Claims, 16 Drawing Sheets

(56) References Cited

U.S. PATENT DOCUMENTS

| | | |
|---|---|---|
| 7,801,120 B2 | 9/2010 | Steinmetz et al. |
| 8,176,238 B2 | 5/2012 | Yu et al. |
| 8,433,833 B2 | 4/2013 | Yang et al. |
| 8,553,466 B2 | 10/2013 | Han et al. |
| 8,559,235 B2 | 10/2013 | Yoon et al. |
| 8,578,106 B1 | 11/2013 | Shapiro |
| 8,588,228 B1 | 11/2013 | Onufryk et al. |
| 8,654,587 B2 | 2/2014 | Yoon et al. |
| 8,700,834 B2 | 4/2014 | Horn et al. |
| 2008/0307146 A1 | 12/2008 | Freking et al. |
| 2009/0122766 A1 | 5/2009 | Hughes et al. |
| 2010/0082855 A1 | 4/2010 | Accapadi et al. |
| 2010/0262979 A1 | 10/2010 | Borchers et al. |
| 2011/0145366 A1 | 6/2011 | Krishnamurthy et al. |
| 2011/0233648 A1 | 9/2011 | Seol et al. |
| 2011/0235415 A1 * | 9/2011 | Park .................. G11C 11/5642 365/185.09 |
| 2013/0054875 A1 | 2/2013 | Ross et al. |
| 2013/0086311 A1 | 4/2013 | Huang et al. |
| 2013/0135816 A1 | 5/2013 | Huang |

FOREIGN PATENT DOCUMENTS

| | | |
|---|---|---|
| KR | 20090026123 A | 3/2009 |
| KR | 20120124396 A | 11/2012 |

* cited by examiner

FIG. 5
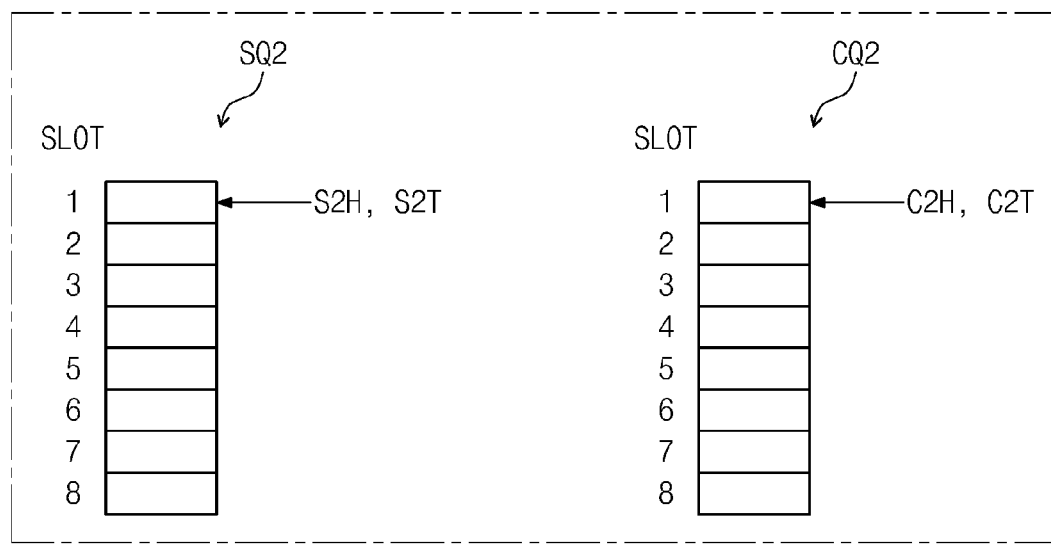
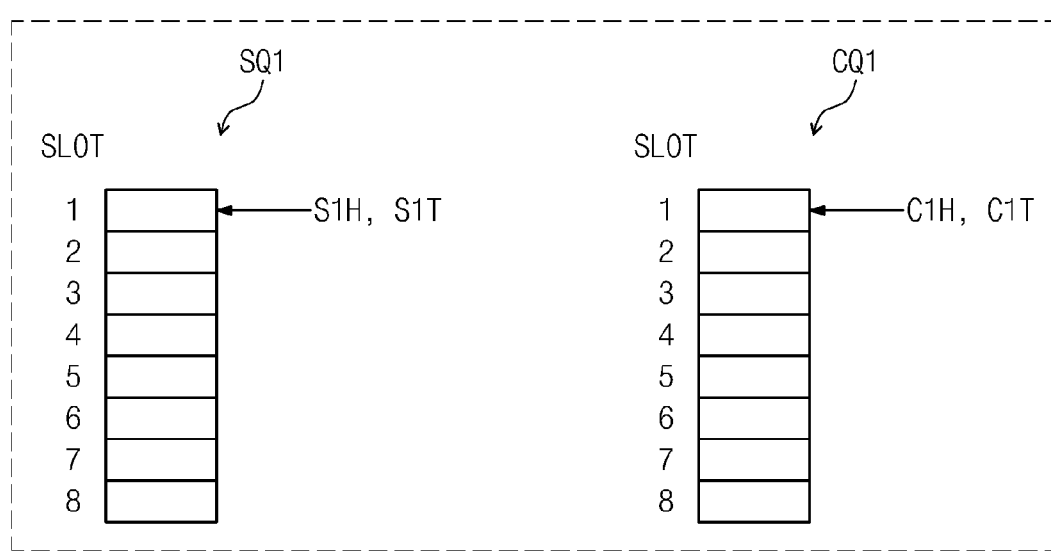

FIG. 6
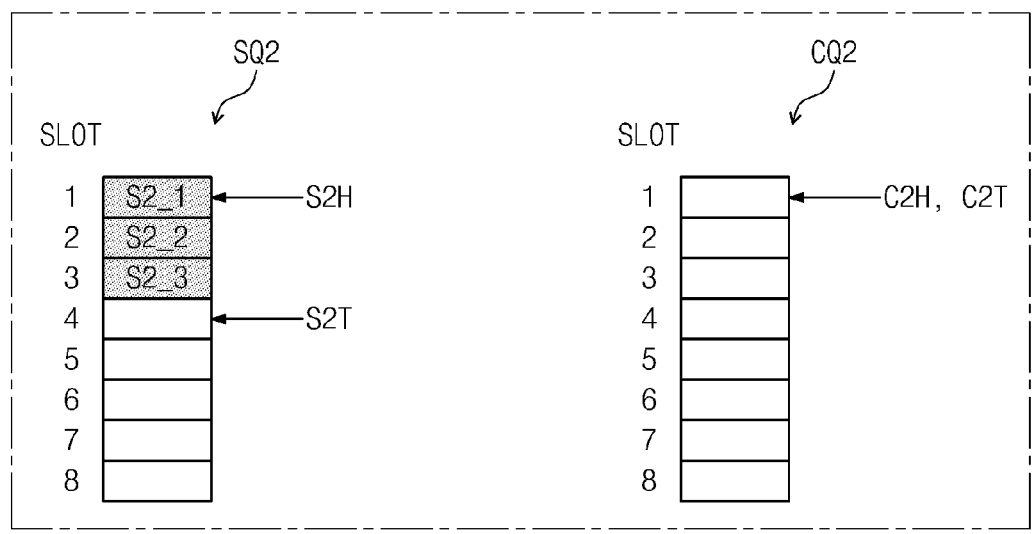
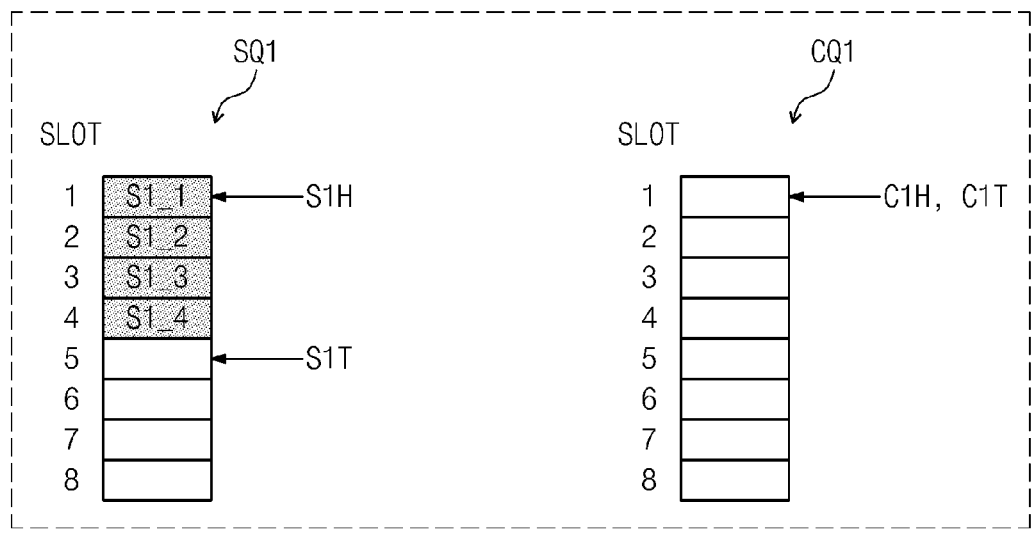

FIG. 7
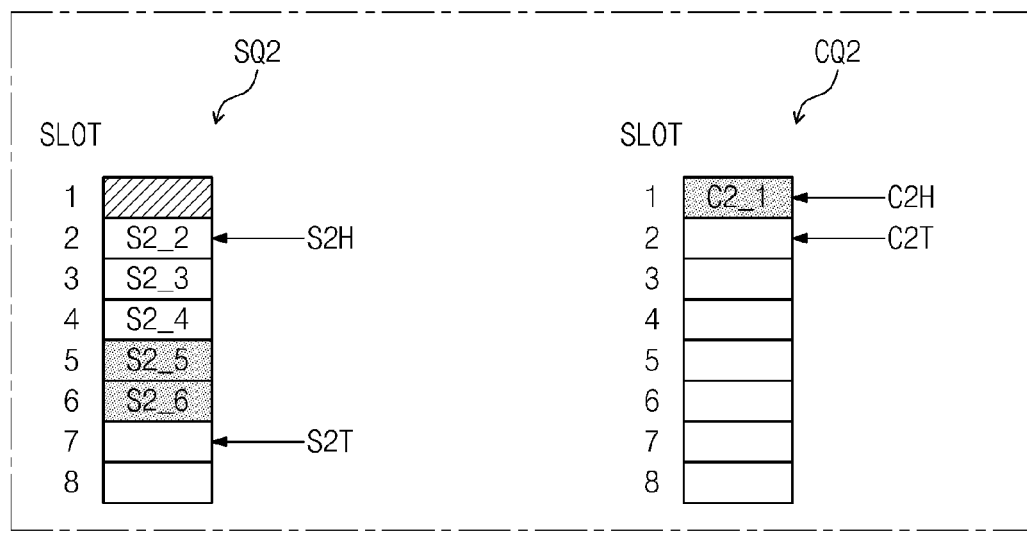
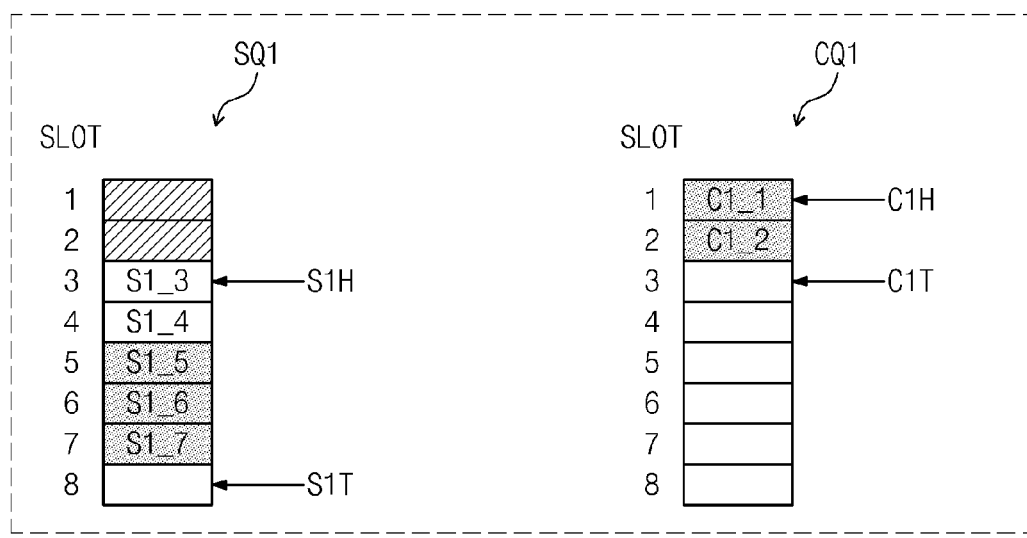

FIG. 8
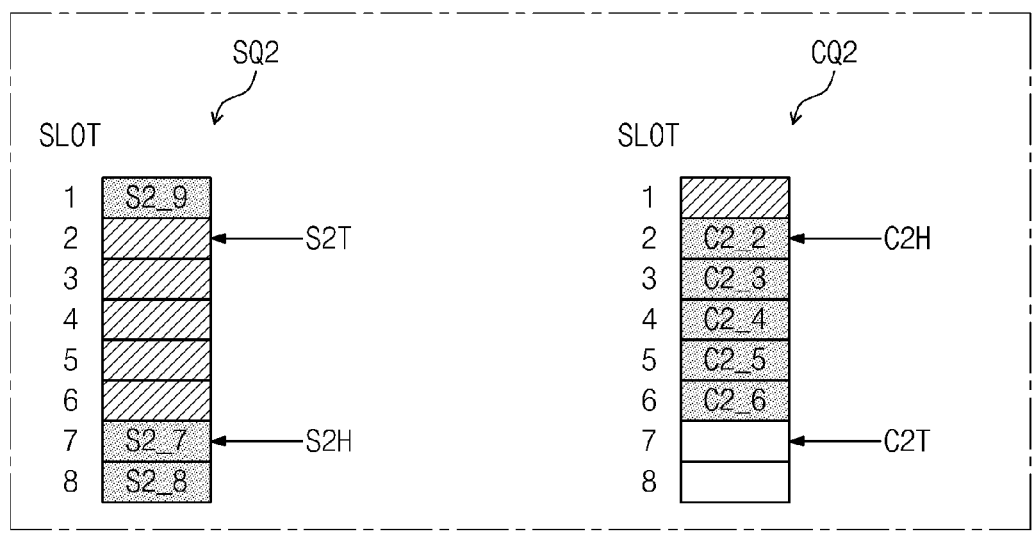
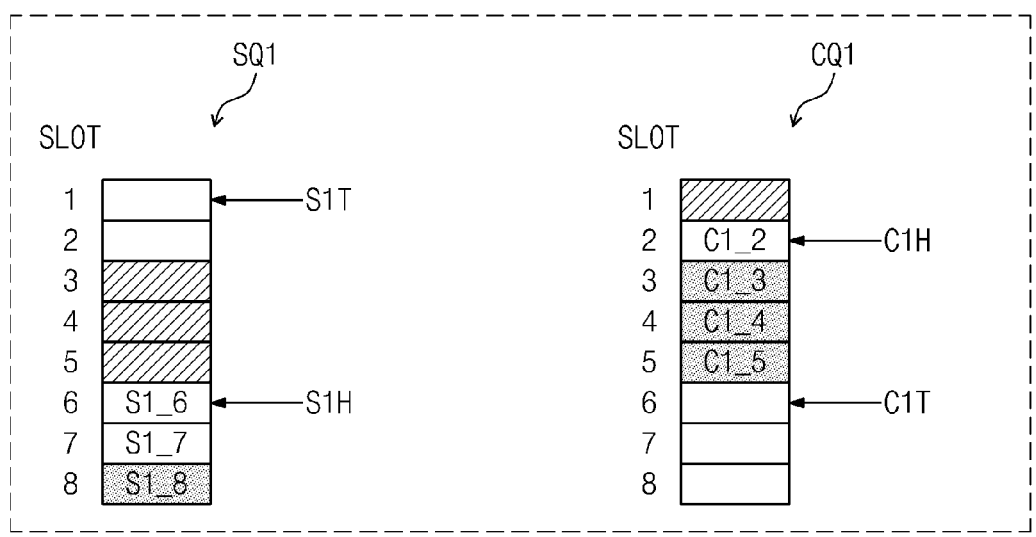

FIG. 9
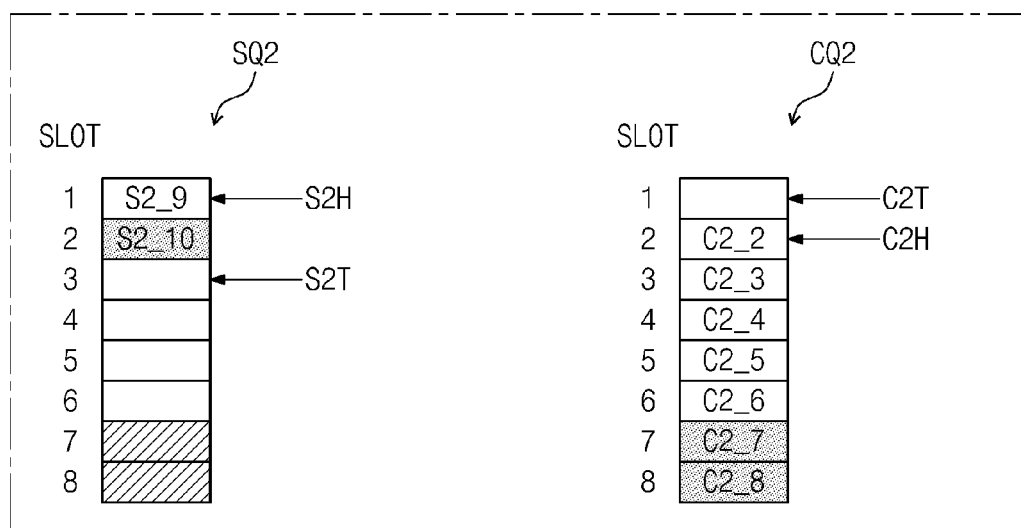
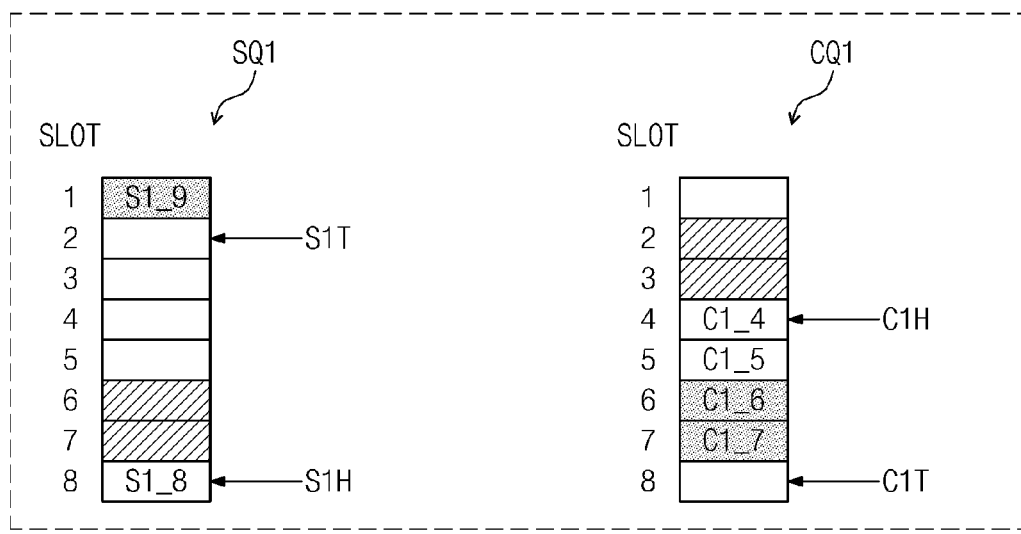

FIG. 14
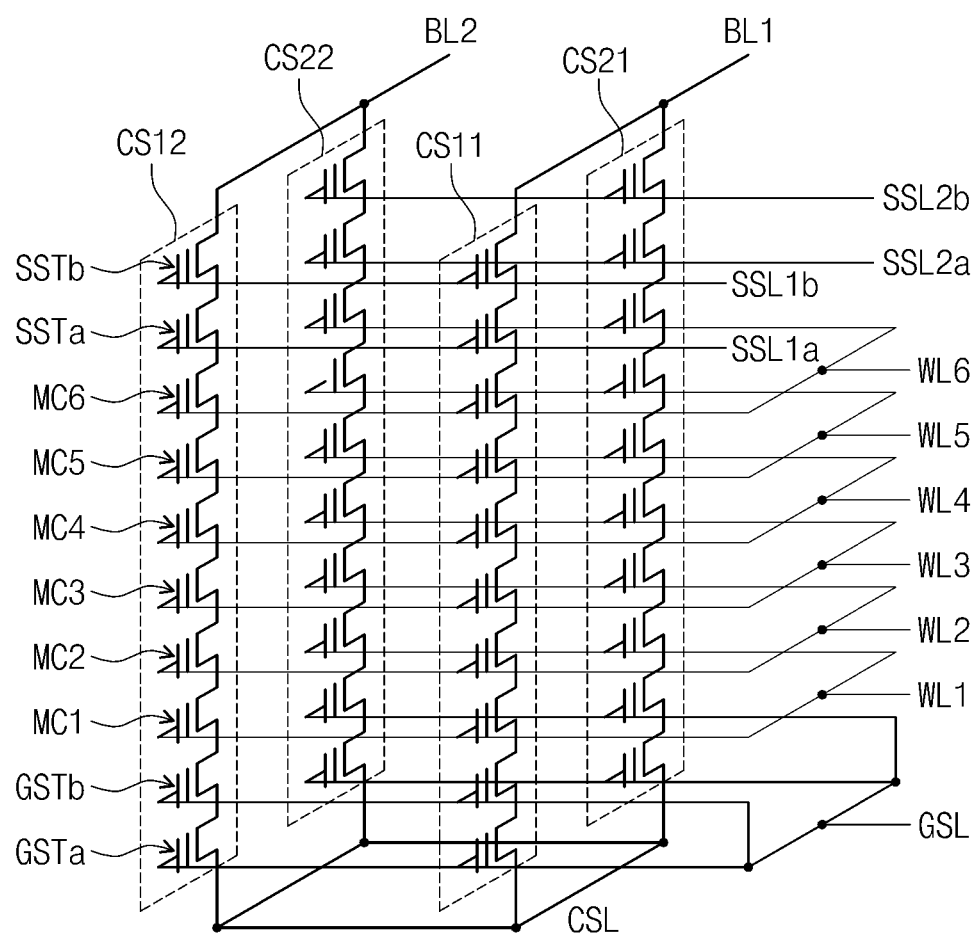
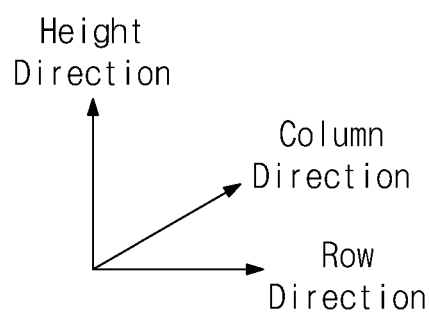

STORAGE DEVICE AND OPERATING METHOD OF THE SAME

CROSS-REFERENCE TO RELATED APPLICATIONS

This U.S. non-provisional patent application claims priority under 35 USC §119 to Korean Patent Application No. 10-2014-0147260, filed on Oct. 28, 2014, the disclosure of which is incorporated by reference in its entirety herein.

BACKGROUND

Technical Field

Embodiments of the present disclosure relate to storage devices and/or operating methods of the same.

Discussion of Related Art

A storage device is a device to store data according to the control of a host device such as a computer, a smartphone, and a smart pad. The storage device includes a device such as a hard disk drive (HDD) to store data in a magnetic disk and a device such as a solid state drive (SSD) and a memory card to store data in a semiconductor memory, particularly a nonvolatile memory.

Nonvolatile memory devices include a read only memory (ROM), a programmable ROM (PROM), an electrically programmable ROM (EPROM), an electrically erasable and programmable ROM (EEPROM), a flash memory, a phase-change RAM (PRAM), a resistive RAM (RRAM), a ferro-electric RAM (FRAM), and the like.

With the advance in semiconductor manufacturing technology, operating speed of a host device such as a computer, a smartphone, and a smart pad communicating with a storage device has been improved. Moreover, capacity of contents used in a storage device and a host device of the storage device has been increasing. Accordingly, there is an increasing demand for a storage device with improved operating speed.

SUMMARY

The present disclosure provides a storage device with improved operating speed and an operating method of the storage device.

According to at least one example embodiment of the inventive concepts, an operating method of a storage device including a nonvolatile memory and a memory controller configured to control the nonvolatile memory includes selecting one of a plurality of submission queues; fetching, from the selected submission queue, a command for accessing the storage device; executing the fetched command; outputting an execution result of the fetched command to a selected completion queue corresponding to the selected submission queue; determining whether a submission queue is a full submission queue, the full submission queue corresponding to a full completion queue; and inhibiting the selecting from selecting the full submission queue until the full completion queue becomes a normal completion queue, when the determining determines a submission queue is the full submission queue, wherein the plurality of submission queues are sequentially selected in accordance with round robin scheduling.

Each of the plurality of submission queues may correspond to a single submission head pointer, and the fetching may include fetching, from a memory of an external host device, a command of a position indicated by a selected submission head pointer corresponding to the selected submission queue.

Each of the plurality of completion queues may correspond to a single completion tail pointer, and the outputting may include storing, in a memory of an external host device, the execution result in a position indicated by a selected completion tail pointer corresponding to the selected completion queue.

Each of the plurality of completion queues may correspond to a single completion head pointer, and the method may further comprise determining whether the selected completion queue is the full completion queue or the normal completion queue, based on a selected completion head pointer corresponding to the selected completion queue and the selected completion tail pointer.

The determining may include determining the selected completion queue to be the full completion queue when the selected completion head pointer and the selected completion tail pointer indicate adjacent addresses, respectively, and an address of the selected completion tail pointer is smaller than that of the selected head pointer.

Each of the selected completion head pointer and the selected completion pointer may indicate an address within a range defined by a smallest address and a largest address, and the determining may include determining the selected completion queue to be the full completion queue when the selected completion head pointer indicates the smallest address and the selected completion tail pointer indicates the largest address.

The plurality of submission queues may have weights, respectively, and the method may further include deciding selection frequencies of the plurality of submission queues based on the weights.

The inhibiting may include adjusting a weight of the full submission queue to zero until the full submission queue is recovered to the normal completion queue.

The inhibiting may further include increasing a weight of at least one normal submission queue among the plurality of submission queues, when the weight of the full submission queue is adjusted to zero.

Each of the plurality of completion queues may correspond to a single completion head pointer and a single completion tail pointer, and the inhibiting may further include selecting the at least one normal submission queue based on the completion head pointer and the completion tail pointer.

The completion head pointer and the completion tail pointer may indicate information on the number of execution results to be processed at a corresponding completion queue, and the inhibiting may further include selecting, as the at least one normal submission queue, a submission queue corresponding to a completion queue with a smallest number of execution results to be processed among the plurality of completion queues.

Each of the plurality of submission queues may correspond to a single submission head pointer and a single submission tail pointer, and the inhibiting may further include selecting the at least one normal submission queue based on the submission head pointer and the completion tail pointer.

The submission head pointer and the submission tail pointer may indicate information on the number of commands to be fetched from a corresponding submission queue, and the inhibiting may include selecting, as the at least one normal submission queue, a submission queue with a largest number of commands to be fetched among the plurality of submission queues.

According to at least one example embodiment of the inventive concepts an operating method of a storage device including a nonvolatile memory and a memory controller configured to control the nonvolatile memory may include fetching a command from a selected one of a plurality of submission queues associated with the storage device; executing the fetched command; outputting an execution result of the fetched command to a selected completion queue corresponding to the selected submission queue; determining whether the selected completion queue is a full completion queue; and performing a background operation when the selected completion queue is determined to be the full completion queue.

The background operation may include a garbage collection operation.

According to at least one example embodiment of the inventive concepts, an operating method of a storage device, the storage device including a nonvolatile memory and a memory controller, may include determining one or more completion queues, from among a plurality of completion queues, to be full completion queues, the plurality of completion queues corresponding, respectively, to a plurality of submission queues, performing a selection operation including, fetching, from one of one or more normal submission queues, a command for accessing the storage device, the one or more normal submission queues being from among the plurality of submission queues and not corresponding to any of the one or more full completion queues, executing the fetched command, and outputting an execution result of the fetched command to the completion queue corresponding to the normal queue from which the command was fetched; and preventing commands from being fetched from one or more full submission queues, the one or more full submission queues being from among the plurality of submission queues and corresponding to the one or more full completion queues.

The method may further include performing the selection operation sequentially for each of the one or more normal queues, if the one or more normal queues include more than one of the plurality of submission queues.

Each of the plurality of submission queues may be associated with a corresponding weight value, the selection operation may include determining which submission queue, from among the plurality of submission queues, has a weight value with the highest level, and selecting, as the normal submission queue from which the command is fetched, the determined submission queue, and the preventing may include reducing the one or more weight values corresponding, respectively, to the one or more inhibited queues.

The method may further include raising the weight value corresponding to a recovered submission queue, the recovered submission queue corresponding to a recovered completion queue, the recovered completion queue being from among the plurality of completion queues and having changed from being one of the one or more full completion queues to not being one of the one or more full completion queues.

According to at least some example embodiments of the inventive concepts, when there is a locked one of a plurality of command ports (or queues), selection of the locked command port (or queue) is inhibited or a background operation is performed. Thus, a resource of a storage device may be prevented from being occupied by a command fetched from the locked command port and operating speed of the storage device may be improved.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 5 to 9 illustrate variations of a submission queue and a completion queue depending on operations of a host device and a storage device;

FIG. 14 is a circuit diagram of a memory block according to at least one example embodiment of the inventive concepts;

DETAILED DESCRIPTION

Figure 1:
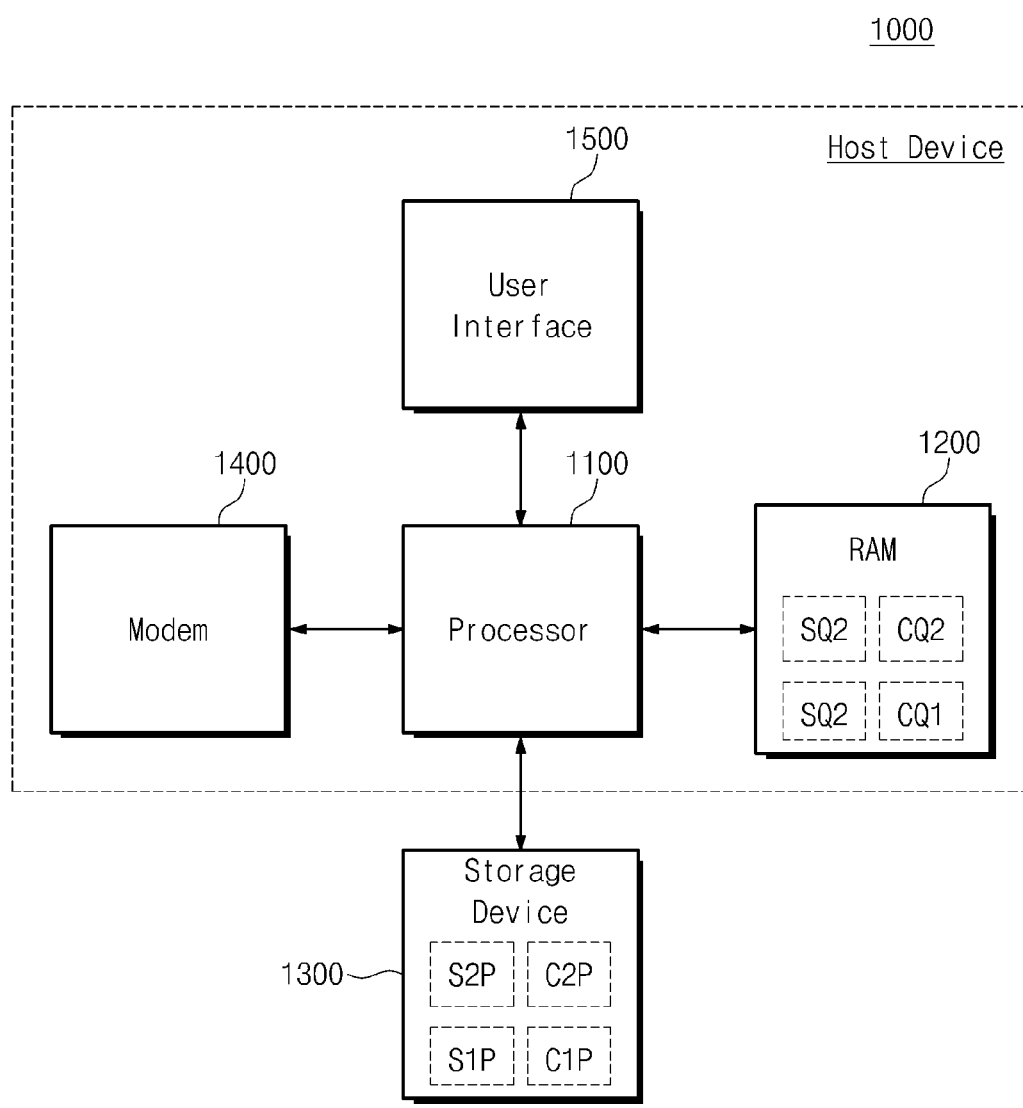
FIG. 1 is a block diagram of a computing device according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a block diagram of a computing device 1000 according to at least one example embodiment of the inventive concepts. As illustrated, the computing device 1000 includes a processor 1100, a RAM 1200, a storage device 1300, a modem 1400, and a user interface 1500.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

The processor 1100 may control the overall operation of the computing device 1000 and performs a logical operation. For example, the processor 1100 may include a system-on-chip (SoC). The processor 1100 may be, for example, a specific-purpose processor or an application processor.

The RAM 1200 may communicate with the processor 1100. The RAM 1200 may be a main memory of the processor 1100 or the computing device 1000. The processor 1100 may temporarily store a code or data in the RAM 1200. The processor 1100 may execute a code and process data using the RAM 1200. The processor 1100 may execute various types of software such as an operating system and an application using the RAM 1200. The processor 1100 may control the overall operation of the computing device 1000 using the RAM 1200. The RAM 1200 may include a volatile memory such as a static RAM (SRAM), a dynamic RAM (DRAM), a synchronous DRAM (SDRAM) or a nonvolatile memory such as a phase-change RAM (PRAM), a magnetic RAM (MRAM), a resistive RAM (RRAM), and a ferroelectric RAM (FRAM).

The storage device 1300 may communicate with the processor 1100. The storage device 1300 may store data for a relatively long time. That is, the processor 1100 may store data which that is to be preserved for a relatively long time in the storage device 1300. The storage device 1300 may store a boot image to drive the computing device 1000. The storage device 1300 may store source codes of various types of software such as an operating system and an application. The storage device 1300 may store data processed as a result of the execution of various types of software such as an operating system and an application.

In some embodiments, the processor 1100 may load the source codes stored in the storage device 1300 to the RAM 1200 and execute the codes loaded to the RAM 1200 to drive the various types of software such as an operating system and an application. The processor 1100 may load the data stored in the storage device 1300 to the RAM 1200 and process the data loaded to the RAM 1200. The processor 1100 may store data which needs to be preserved for a relatively long time, among the data stored in the RAM 1200, in the storage device 1300.

The storage device 1300 may include a nonvolatile memory such as a flash memory, a phase-change RAM (PRAM), a magnetic RAM (MRAM), a resistive RAM (RRAM), and a ferroelectric RAM (FRAM).

The modem 1400 may communicate with an external device according to the control of the processor 1100. For example, the modem 1400 may perform wired or wireless communications with an external device. The modem 1400 may perform communications based on one or more of a plurality of wireless communication techniques or protocols including, for example, LTE (Long Term Evolution), WiMax, GSM (Global System for Mobile communication), CDMA (Code Division Multiple Access), Bluetooth, NFC (Near Field Communication), WiFi, and RFID (Radio Frequency Identification), and/or one or more of a plurality of wired communication techniques or protocols including, for example, USB (Universal Serial Bus), SATA (Serial AT Attachment), SCSI (Small Computer Small Interface), Firewire, PCI (Peripheral Component Interconnection), PCIe (PCI express), NVMe (NonVolatile Memory express), UFS (Universal Flash Storage), SD (Secure Digital), SDIO, UART (Universal Asynchronous Receiver Transmitter), SPI (Serial Peripheral Interface), HS-SPI (High Speed SPI), RS232, I2C (Inter-integrated Circuit), HS-I2C, I2S, (Integrated-interchip Sound), S/PDIF (Sony/Philips Digital Interface), MMC (MultiMedia Card), eMMC (embedded MMC).

The user interface 1500 may communicate with a user according to the control of the processor 1100. For example, the user interface 1500 may include one or more user input interfaces. Examples of the one or more user input interfaces include a keyboard, a keypad, a button, a touch panel, a touch screen, a touch pad, a touch ball, a camera, a microphone, a gyroscope sensor, and a vibration sensor. The user interface 1500 may include one or more user output interfaces. Examples of the one or more user output interfaces include a liquid crystal display (LCD), an organic light emitting diode (OLED) display, an active matrix OLED (AMOLED), an LED, a speaker, and a monitor.

The storage device 1300 may communicate with a host device based on one of various interface standards such as NVMe, PCI, PCIe, USB, and SATA. For example, the storage device 1300 will be described herein with reference to a scenario in which the storage device 1300 communicates with the host device based on NVMe. However, according to at least some example embodiments of the inventive concepts, the storage device 1300 is not limited to communicating with the host device based on NVMe.

The host device may communicate with the storage device 1300 through a plurality of submission queues SQ1 and SQ2 and a plurality of completion queues CQ1 and CQ2. The storage device 1300 may communicate with the host device using a plurality of submission pointers S1P and S2P and a plurality of completion pointers C1P and C2P. A first submission pointer S1P and a first completion pointer C1P may correspond to a first submission queue S1Q and a first completion queue C1Q, respectively. A second submission pointer S2P and a second completion pointer C2P may correspond to a second submission queue S2Q and a second completion queue C2Q, respectively.

A submission queue SQ is configured to store a command to be transmitted to the storage device 1300, which may be, for example, a command to be fetched by the storage device 1300. A submission pointer SP may include information on commands registered in the submission queue SQ. For example, the submission pointer SP may include a submission head pointer SH and a submission tail pointer ST. The submission head pointer SH indicates a slot in which an earliest command (or most urgent command) is registered, among slots of the submission queue SQ. The submission tail pointer ST indicates a first slot (e.g., a slot having a smallest address) of empty slots or slots emptied in the earliest time, among the slots of the submission queue SQ. Each of the pointers SH and ST may include addresses of the RAM 1200 assigned to a slot of the submission queue SQ.

A completion queue CQ is configured to store an execution result of a command executed by the storage device 1300. A completion pointer CP may include information on execution results registered in the completion queue CQ. For example, the completion pointer CP may include a completion head pointer CH and a completion tail pointer CT. The completion head pointer CH indicates a slot in which an earliest execution result is registered, among slots of the completion queue CQ. The completion tail pointer CT indicates a first slot (e.g., a slot having a smallest address) of empty slots or slots emptied in the earliest time, among the slots of the completion queue CQ. Each of the pointers CH and CT may include addresses of the RAM 1200 assigned to a slot of the completion queue CQ.

A method of communication between the host device and the storage device 1300 will be described in further detail later with reference to FIGS. 3 and 4.

In FIG. 1, it has been described that a single submission queue SQ and a single completion queue CQ correspond to a single submission pointer SP and a single completion pointer CP, respectively. However, the inventive concepts are not limited to the description. For example, two or more submission queues may share a single completion queue. That is, i submission queues SQ (i being a positive integer equal to or greater than 2) and j completion queues CQ (j being a positive integer smaller than i) may correspond to i submission pointers SP and j completion pointers CP, respectively.

Figure 2:
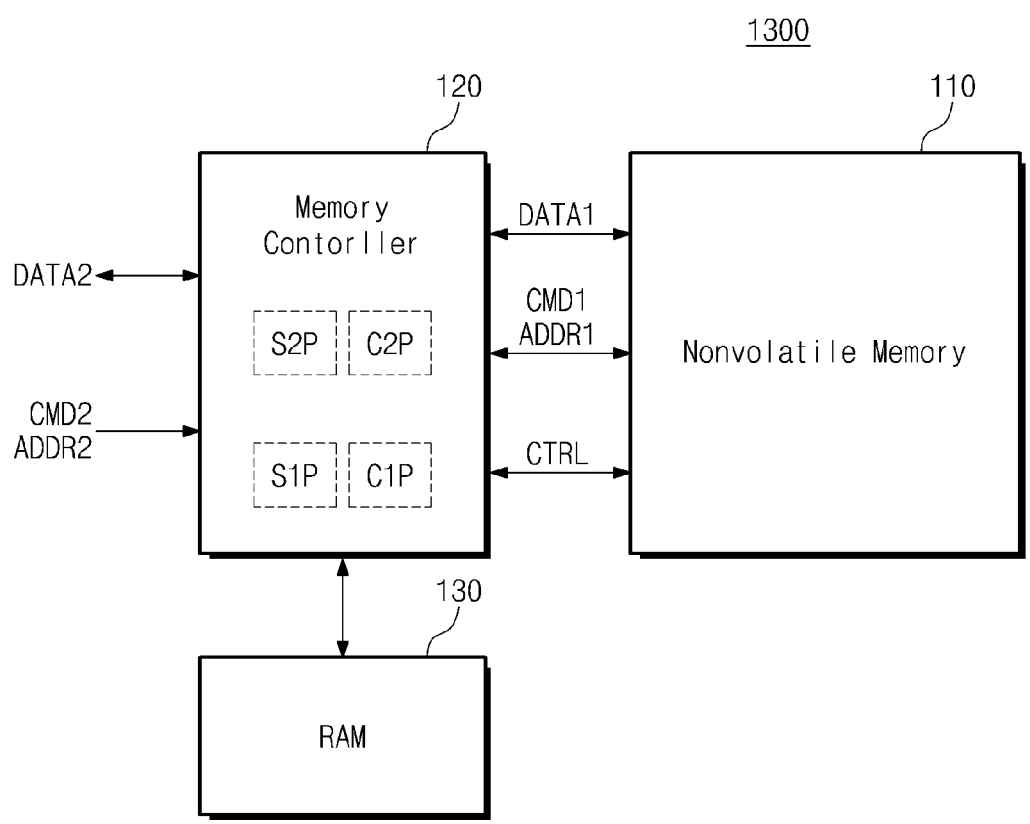
FIG. 2 is a block diagram of a storage device according to at least one example embodiment of the inventive concepts.

FIG. 2 is a block diagram of the storage device 1300 according to at least one example embodiment of the inventive concepts. Referring to FIGS. 1 and 2, the storage device 1300 includes a nonvolatile memory 110, a memory controller 120, and a RAM 130.

The nonvolatile memory 110 may perform write, read, and erase operations according to the control of the memory controller 120. The nonvolatile memory 110 may exchange first data DATA1 with the memory controller 120. For example, the nonvolatile memory 110 may receive the first data DATA1 from the memory controller 120 and write the first data DATA1. The nonvolatile memory 110 may perform a read operation and output the read first data DATA1 to the memory controller 120. The memory controller 120 may be, be implemented by, or be included in, circuitry or one or more circuits configured to perform the functions described herein as being performed by the memory controller 120. Alternatively, the memory controller 120 may also be implemented by a processor executing a program including instructions (e.g., code) corresponding to the functions described herein as being performed by the memory controller 120.

Operations described herein as being performed by the storage device 1300 may be performed by, or under the control of, the memory controller 120.

The nonvolatile memory 110 may receive a first command CMD1 and a first address ADDR1 from the memory controller 120. The nonvolatile memory 110 may exchange a control signal CTRL with the memory controller 120. For example, the nonvolatile memory 110 may receive, from the memory controller 120, at least one of a chip select signal/CE to select at least one of semiconductor chips constituting the nonvolatile memory 110, a command latch enable signal CLE to indicate that a signal received from the memory controller 120 is the first command CMD1, an address latch enable signal ALE to indicate that a signal received from the memory controller 120 is the first address ADDR1, a read enable signal/RE generated by the memory controller 120 during a read operation and periodically toggled to be used to set timings, a write enable signal/WE enabled by the memory controller 120 when the first command CMD1 or the first address ADDR1 is transmitted, a write protect signal/WP enabled by the memory controller 120 to prevent an unintentional write or erase operation when power changes, and a data strobe signal DQS generated by the memory controller 120 during a write operation and periodically toggled to be used to set input synchronization of the first data DATA1. For example, the nonvolatile memory 110 may output, to the memory controller 120, at least one of a ready/busy signal R/nB to indicate that the nonvolatile memory 110 is performing a program, erase or read operation and a data strobe signal DQS generated from the read enable signal/RE by the nonvolatile memory 110 and toggled to be used to set output synchronization of the first data DATA1.

The nonvolatile memory 110 may include a flash memory. However, the nonvolatile memory 110 is not limited to inclusion of the flash memory. The nonvolatile memory 110 may include at least one of various nonvolatile memories such as a phase-change RAM (PRAM), a magnetic RAM (MRAM), a resistive RAM (RRAM), and a ferroelectric RAM (FRAM).

The memory controller 120 is configured to control the nonvolatile memory 110. For example, the memory controller 120 may control the nonvolatile memory 110 to perform a write, read or erase operation. The memory controller 120 may exchange the first data DATA1 and the control signal CTRL with the nonvolatile memory 110 and output the first command CMD1 and the first address ADDR1 to the nonvolatile memory 110.

The memory controller 120 may control the nonvolatile memory 110 according to the control of an external host device (not shown). The memory controller 120 may exchange second data DATA2 with the host device and receive a second command CMD2 and a second address ADDR2 from the host device.

In some embodiments, the memory controller 120 may exchange the first data DATA1 with the nonvolatile memory 110 in a first unit (e.g., time unit or data unit) and exchange the second data DATA2 with the host device in a second unit (e.g., time unit or data unit) different from the first unit.

The memory controller 120 may exchange the first data DATA1 with the nonvolatile memory 110 according to a first format and transmit the first command CMD1 and the first address ADDR1 to the nonvolatile memory 110. The memory controller 120 may exchange the second data DATA2 with the host device according to a second format different from the first format and receive the second command CMD2 and the second address ADDR2 from the host device.

The memory controller 120 may store the first submission pointer S1P, the first completion pointer C1P, the second submission pointer S2P, and the second completion pointer C2P. The memory controller 120 may fetch the second command CMD2 from the first submission queue S1Q of the host device using the first submission pointer S1P. The memory controller 120 may output an execution result of the second command CMD2 to the first completion queue C1Q of the host device using the first completion pointer C1P. The memory controller 120 may fetch the second command CMD2 from the second submission queue S2Q of the host device using the second submission pointer S2P. The memory controller 120 may output an execution result of the second command CMD2 to the second completion queue C2Q of the host device using the second completion pointer C2P.

The memory controller 120 may use the RAM 130 as a buffer memory, a cache memory or a working memory. For example, the memory controller 120 may receive the second data DATA2 from the host device, store the received second data DATA2 in the RAM 130, and write the stored second data DATA2 into the nonvolatile memory 110 as the first data DATA1. The memory controller 120 may read the first data DATA1 from the nonvolatile memory 110, store the received first data DATA1 in the RAM 130, and output the stored first data DATA1 to the host device as the second data DATA2. The memory controller 130 may store the data read from the nonvolatile memory 110 in the RAM 130 and rewrite the stored data into the nonvolatile memory 110.

The memory controller 120 may store data or a code required to manage the nonvolatile memory 110 in the RAM 130. For example, the memory controller 120 may read the data or the code required to manage the nonvolatile memory 110 from the nonvolatile memory 110 and load the data or the code to the RAM 130 to drive the nonvolatile memory 110.

The RAM 130 may include at least one of various random access memories such as a dynamic RAM (DRAM), a static RAM (SRAM), a synchronous DRAM (SDRAM), a phase-change RAM (PRAM), a magnetic RAM (MRAM), a resistive RAM (RRAM), and a ferroelectric RAM (FRAM).

The storage device 1300 may perform address mapping to reduce an overhead that an erase operation occurs in the nonvolatile memory 110. For example, when overwrite is requested from an external host device, the storage device 1300 may store overwrite-requested data in memory cells of a free storage space instead of erasing memory cells in which existing data is stored and storing overwrite-requested data in the erased memory cells. The memory controller 120 may drive a flash translation layer (FTL) to map a logical address used in the external host device and a physical address used in the nonvolatile memory 110 according to the foregoing method. For example, the second address ADDR2 may be a logical address and the first address ADDR1 may be a physical address.

The storage device 1300 may write, read or erase data according to a request of the host device. The storage device 1300 may include a solid state drive (SSD) or a hard disk drive (HDD). The storage device 1300 may include a personal computer memory card international association (PCMCIA) card, a compact flash card (CF), a smart media card (SM or SMC), a memory stick, a multimedia card (MMC, RS-MMC or MMCmicro), an SD card (SD, miniSD, microSD or SDHC), a universal flash storage (UFS). The storage device 1300 may include an embedded memory such as an embedded multimedia card (eMMC), UFS, and perfect page new (PPN).

Figure 3:
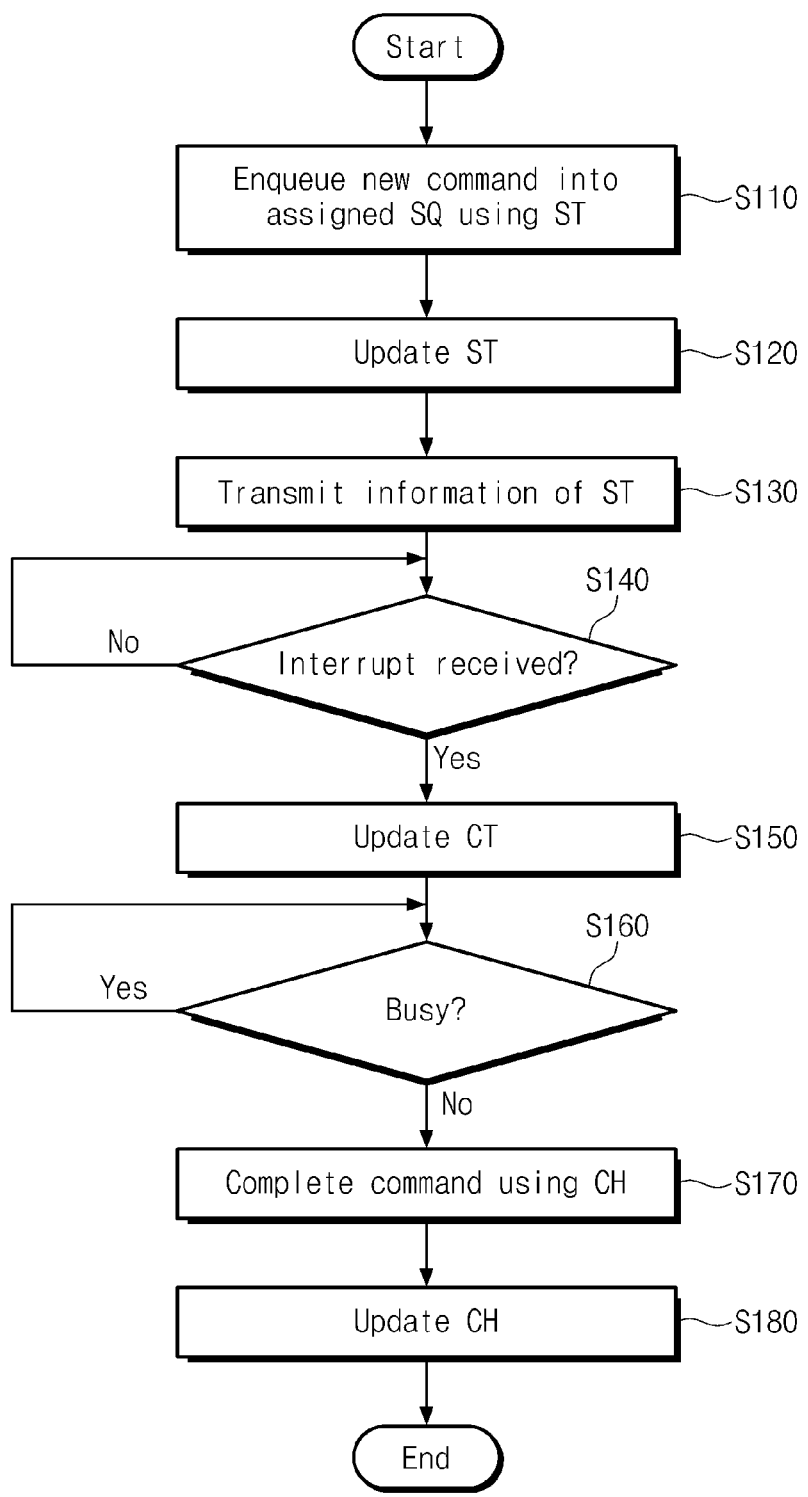
FIG. 3 is a flowchart summarizing an operating method of a host device accessing a storage device.

FIG. 3 is a flowchart summarizing an operating method of the host device accessing the storage device 1300. FIG. 3 illustrates an example procedure from transmitting a single command to the storage device 1300 by the host device until the transmitted command is processed.

Referring to FIGS. 1 to 3, the host device may enqueue a new command to be transmitted to the storage device 1300 to an assigned submission queue SQ (S110). For example, when a core or a virtual device generating a new command is assigned to the first submission queue SQ1, the new command may be enqueued to the first submission queue SQ1. When a core or a virtual device generating a new command is assigned to the second submission queue SQ2, the new command may be enqueued to the second submission queue SQ2. For example, the host device may enqueue a new command to a slot of a submission queue SQ indicated by the submission tail pointer ST of the submission pointer SP. For example, the submission tail pointer ST may include an address of the RAM 1200 assigned to the slot of the submission queue SQ.

The host device updates the submission tail pointer ST of the assigned submission queue SQ such that the submission tail pointer ST indicates a next slot (e.g., empty slot) of the submission queue SQ (S120).

The host device may transmit, to the storage device 1300, information to inform that the submission tail pointer ST of the assigned submission queue SQ is updated or the submission tail pointer ST (S130).

The host device determines whether an interrupt is received from the storage device 1300 (S140). For example, the host device may determine whether an interrupt to inform that execution of a command is completed in the storage device 1300 is received from the storage device 1300. The host device may perform another operation or stand by until the interrupt is received from the storage device 1300.

When the interrupt is received from the storage device 1300, the host device 1300 updates the completion tail pointer CT of the completion pointer CP (S150). For example, the host device may update the completion tail pointer CT corresponding to the received interrupt such that the completion tail pointer CT indicates a next slot (e.g., empty slot) of the completion queue CQ. For example, the completion tail pointer CT may include an address of the RAM 1200 assigned to a slot of the completion queue CQ. Information of the updated completion tail pointer CT or an updated completion tail pointer CT may be transmitted to the storage device 1300.

When S150 is performed, an execution result of the command transmitted to the storage device 1300 is enqueued to the completion queue CQ. More specifically, at least one slot indicated by the completion head pointer CH contains the execution result. For example, the completion head pointer CH may include an address of the RAM assigned to the slot of the completion queue SQ.

When the host device is not in a busy state (S160), the flow proceeds to S170. The host device may check an execution result indicated by the completion head pointer CH and perform completion processing on the execution result (S170). For example, the host device may check that data was normally written into the storage device 1300 or data was normally read from the storage device 1300 and perform a subsequent operation. The host device may check whether an error occurred during accessing the storage device 1300 and perform a subsequent operation. The completion-processed execution result may be deleted from the completion queue CQ.

The host device updates the completion head pointer CH (S180). For example, the host device may update the completion head pointer CH corresponding to the received interrupt such that the completion head pointer CH indicates a next slot (e.g., an empty slot or a slot in which the execution result is stored) of the completion queue CQ. Information of the updated completion head pointer CH or an updated completion head pointer may be transmitted to the storage device 1300.

The host device may asynchronously perform an operation to enqueue the new command (S110 to S130), an operation to check that the transmitted command was executed (S140 and S150), and an operation to perform completion-processing on the execution result (S160 and S180). For example, the host device may enqueue a next command to the submission queue SQ, irrespective of whether an interrupt of a previous command is received from the storage device 1300 and irrespective of whether an execution result of the previous command is checked at the completion queue CQ. For example, the host device may enqueue new commands to the submission queue SQ by a depth-allowable value of the submission queue SQ, irrespective of an interrupt or a completion queue CQ.

In addition, the host device may update the completion tail pointer CT whenever an interrupt is received, irrespective of the enqueue of the submission queue SQ and the check of the completion queue CQ. The host device may perform sequential completion processing on execution results registered in the completion queue CQ using the completion head pointer CH, irrespective of the enqueue of the submission queue SQ and the interrupt.

Figure 4:
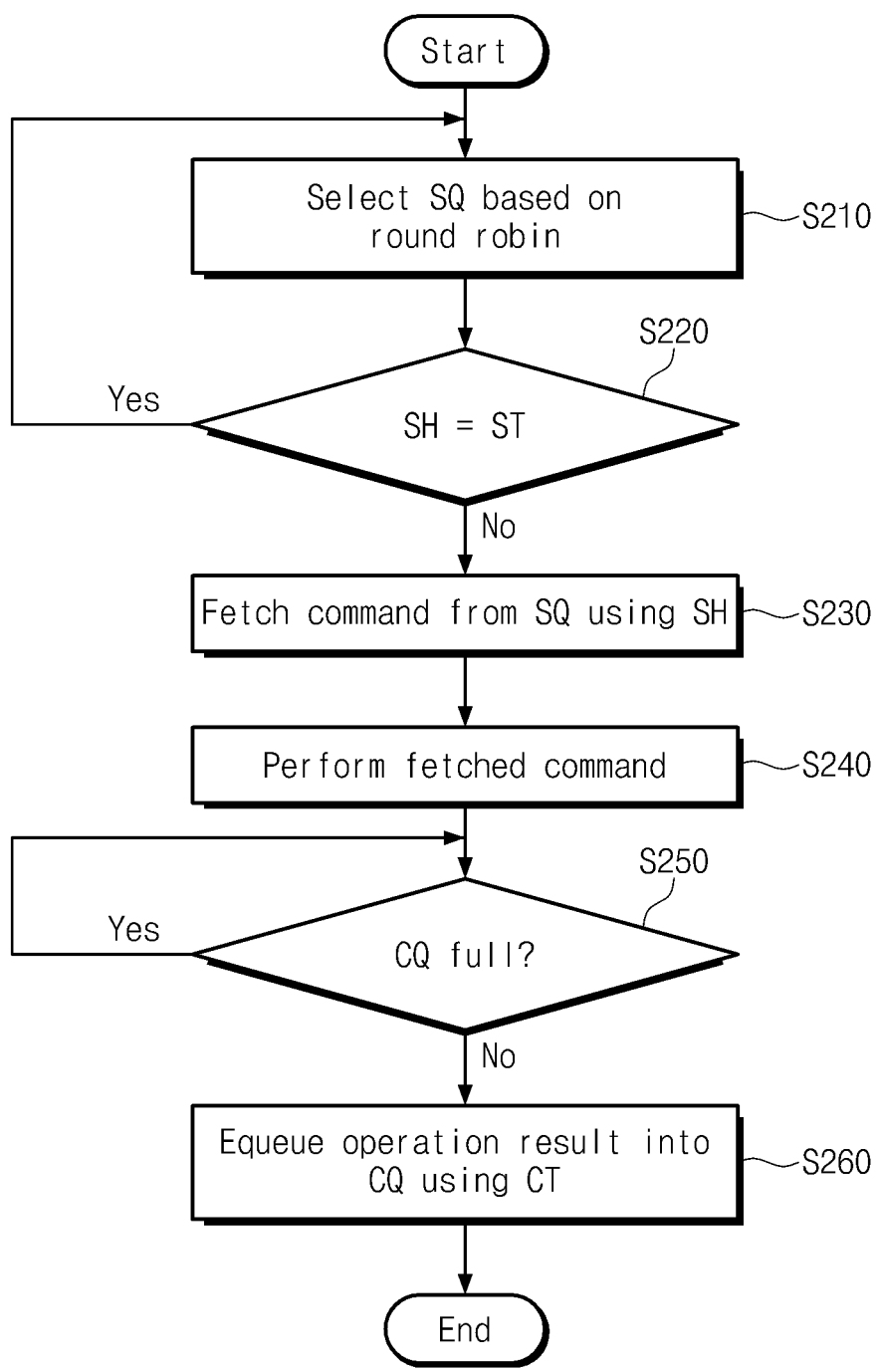
FIG. 4 is a flowchart summarizing an example of an operating method of a storage device.

FIG. 4 is a flowchart summarizing an example of an operating method of the storage device 1300. Referring to FIGS. 1 to 4, the storage device 1300 selects one of a plurality of submission queues SQ in accordance with round robin scheduling (S210).

The storage device 1300 determines whether there is a command registered in the selected submission queue SQ (S220). For example, when the submission head pointer SH and the submission tail pointer ST of the selected submission queue SQ indicate the same slot (e.g., address) of the selected submission queue SQ, the storage device 1300 may determine that there is no command registered in the selected submission queue SQ. When there is no command registered in the selected submission queue SQ, a next submission queue SQ may be selected (S210). When there is a command registered in the selected submission queue SQ, the flow proceeds to S230.

The storage device 1300 fetches the command from the submission queue SQ using the submission head pointer SH (S230). For example, the storage device 1300 may fetch the command registered in the slot of the submission queue SQ indicated by the submission head pointer SH from the RAM 1200. For example, the submission head pointer SH may include an address of the RAM 1200 assigned to the slot of the submission queue SQ.

The storage device 1300 may execute the fetched command (S240).

The storage device 1300 determines whether a corresponding selected completion queue CQ (i.e., the completion queue corresponding to the submission queue SQ selected in step S210) is full in the selected submission queue SQ (S250). According to at least one example embodiment, a completion queue CQ that receives the results of a completed command and the submission queue SQ from which the command was fetched are referred to herein as corresponding to one another. For example, when the completion head pointer CH and the completion tail pointer CT indicate sequential addresses (e.g., addresses of the RAM 1200) and the address indicated by the completion tail pointer CT is smaller than that indicated by the completion head pointer CH, the storage device 1300 may determine that the selected completion queue CQ is full. In other embodiments, when the completion head pointer CH indicates a smallest address within an address range of the selected completion queue CQ and the completion tail pointer CT indicates a largest address in the address range of the selected completion queue CQ, the storage device 1300 may determine that the selected completion queue CQ is full.

When a result of the determination is that the completion queue CQ is full, the storage device 1300 stands by until an empty slot is generated at the completion queue CQ. When the completion queue CQ is not full and there is an empty slot, the storage device 1300 enqueues an execution result of the command to the completion queue CQ using the completion tail pointer CT (S260). For example, the storage device 1300 may store the execution result of the command in the slot of the completion queue CQ indicated by the completion tail pointer CT.

In some embodiments, the storage device 1300 may support a multi-threading. The operating method in FIG. 4 may be carried out by a single thread of the storage device 1300. While a first thread executes a fetched first command, a second thread may execute a second command through another submission queue SQ. Commands may be simultaneously fetched and executed by the number of multi-threading supported by the storage device 1300.

FIGS. 5 to 9 illustrate variations of a submission queue and a completion queue depending on operations of the host device and the storage device 1300. Referring to FIGS. 1 to 5, let it be assumed that each of the first submission queue SQ1, the first completion queue CQ1, the second submission queue SQ2, and the second completion queue CQ2 has eight slots. However, sizes of the first submission queue SQ1, the first completion queue CQ1, the second submission queue SQ2, and the second completion queue CQ2 are not limited.

First to eighth slots of the first submission queue SQ1 may be assigned to a storage space having sequential addresses among storage spaces of the RAM 1200. An address of the first slot may be smallest and an address of the eighth slot may be greatest within the address range of the RAM 1200 assigned to the first submission queue SQ1.

First to eighth slots of the second submission queue SQ2 may be assigned to a storage space having sequential addresses among the storage spaces of the RAM 1200. An address of the first slot may be smallest and an address of the eighth slot may be greatest within the address range of the RAM 1200 assigned to the second submission queue SQ2.

First to eighth slots of the first completion queue CQ1 may be assigned to a storage space having sequential addresses among the storage spaces of the RAM 1200. An address of the first slot may be smallest and an address of the eighth slot may be greatest within the address range of the RAM 1200 assigned to the first completion queue CQ1.

First to eighth slots of the second completion queue CQ2 may be assigned to a storage space having sequential addresses among the storage spaces of the RAM 1200. An address of the first slot may be smallest and an address of the eighth slot may be greatest within the address range of the RAM 1200 assigned to the second completion queue CQ2.

A head pointer indicates a slot storing information to be used next from a corresponding queue. For example, the head pointer may indicate a slot of the oldest information or a slot of the highest priority information among information registered in the corresponding queue. In an initial state, the head pointer may indicate a slot having the smallest address among slots of the corresponding queue. Whenever information registered in a queue is erased, the head pointer may be updated to indicate a slot having an address that is successive to an address of a previous slot. When the head pointer indicates a slot having the largest address among the slots of the corresponding queue, the head pointer may be updated to indicate a slot having the smallest address among the slots of the corresponding queue.

A tail pointer may indicate a slot where new information is to be registered in a corresponding queue. In an initial state, the tail pointer may indicate a slot having the smallest address or an earliest empty slot among empty slots of the corresponding queue. Whenever new information is enqueued to a queue, the tail pointer may be updated to indicate a slot having an address that is successive to an address of a previous slot, where the previous slot is, for example, the slot into which the new information is enqueued. When the tail pointer indicates a slot having the largest address among slots of the corresponding queue, and new information that is to be enqueued is received, the tail pointer may be updated to indicate a slot having the smallest address among the slots of the corresponding queue.

In an initial state, the first submission queue SQ1, the first completion queue CQ1, the second submission queue SQ2, and the second completion queue CQ2 may be an empty state. At the first submission queue SQ1, the first submission head pointer S1H and the first submission tail pointer S1T may indicate a first slot having the smallest address. At the first completion queue CQ1, the first completion head pointer C1H and the first completion tail pointer C1T may indicate a first slot having the smallest address. At the second submission queue SQ2, the second submission head pointer S2H and the second submission tail pointer S2T may indicate a first slot having the smallest address. At the second completion queue CQ2, the second completion head pointer C2H and the second completion tail pointer C2T may indicate a first slot having the smallest address.

Referring to FIGS. 1 to 4 and FIG. 6, at the first and second submission queues SQ1 and SQ2, slots to which a new command is enqueued are represented by dots (i.e., darker shading as shown in FIG. 4, for example, with respect to slots 1-4 of the first submission queue SQ1 and slots 1-3 of the second submission queue SQ2). For example, first to fourth commands S1_1 to S1_4 may be enqueued to first to fourth slots of the first submission queue SQ1, respectively. For example, a core or a virtual device accessing the storage device 1300 through the first submission queue SQ1 may sequentially enqueue the first to fourth commands S1_1 to S1_4 to the first submission queue SQ1.

The first submission head pointer S1H may indicate a first slot in which the oldest one of commands S1_1 to S1_4 registered in the first submission queue SQ1, i.e., first command S1_1 is stored. For example, since there is no command removed from the first submission queue SQ1, the first submission head pointer S1H may be maintained at an initial position to indicate the first slot.

The first submission tail pointer S1T may be updated to indicate a fifth slot having the smallest address among fifth to eighth slots. For example, when the first command S1_1 is enqueued to the first submission queue SQ1, the first submission tail pointer S1T may be updated to indicate a second slot. When the second command S1_2 is enqueued to the first submission queue SQ1, the first submission tail pointer S1T may be updated to indicate a third slot. When the third command S1_3 is enqueued to the first submission queue SQ1, the first submission tail pointer S1T may be updated to indicate a fourth slot. When the fourth command S1_4 is enqueued to the first submission queue SQ1, the first submission tail pointer S1T may be updated to indicate a fifth slot.

First to third commands S2_1 to S2_3 may be enqueued to first to third slots of the second submission queue SQ2, respectively. For example, a core or a virtual device accessing the storage device 1300 through the second submission queue SQ2 may sequentially enqueue the first to third commands S2_1 to S2_3 to the second submission queue SQ2.

The second submission head pointer S2H may indicate a first slot in which the oldest one of commands S2_1 to S2_3 registered in the second submission queue SQ2, i.e., first command S2_1 is stored. For example, since there is no command removed from the second submission queue SQ2, the second submission head pointer S2H may be maintained at an initial position.

The first submission tail pointer S1T may be updated to indicate a fourth slot having the smallest address among fourth to eighth slots that are empty. For example, as the first to third commands S2_1 to S2_3 are enqueued to the second submission queue SQ2, the second submission tail pointer S2T may be updated to indicate the fourth slot having an address that is successive to an address of the third slot.

Referring to FIGS. 1 to 4 and FIG. 7, at the first and second submission queues SQ1 and SQ2, slots to which a new command is enqueued are represented by dots (i.e., darker shading) and slots where a registered command is removed are represented by diagonal lines (i.e., lighter shading). At the first and second completion queues CQ1 and CQ2, slots to which new execution results are enqueued are represented by dots.

For example, fifth to seventh commands S1_5 to S1_7 may be sequentially enqueued to fifth to seventh slots of the first submission queue SQ1. As the fifth to seventh command S1_5 to S1_7 are enqueued, the first submission tail pointer S1T may be updated to indicate an eighth slot having an address that is successive to an address of the seventh slot.

The first and second slots of the first submission queue SQ1 may be emptied. For example, the storage device 1300 may fetch the first and second commands S1_1 and S1_2 registered in the first and second slots of the first submission queue SQ1 by using the first submission head pointer S1H. As the storage device 1300 fetches the first command S1_1, the first slot in which the first command S1_1 is registered may be emptied. The first submission head pointer S1H may be updated to indicate a second slot having an address that is successive to the address of the first slot. As the storage device 1300 fetches the second command S1_2, the second slot in which the second command S1_2 is registered may be emptied. The first submission head pointer S1H may be updated to indicate a third slot having an address that is successive to the address of the second slot.

According to at least one example embodiment of the inventive concepts, the enqueueing of commands to the first submission queue SQ1 is performed by the host device, and the fetching of commands from the first submission queue SQ1 is performed by the storage device 1300. The enqueueing and fetching associated with the first submission queue SQ1 may be performed independently of each other. The storage device 1300 may execute the fetched first and second commands S1_1 and S1_2.

When the storage device 1300 completes execution of the fetched first and second commands S1_1 and S1_2, the storage device 1300 may sequentially enqueue first and second execution results C1_1 and C1_2 to the first completion queue CQ1. As the first and second execution results C1_1 and C1_2 are enqueued, the first completion tail pointer C1T may be updated to indicate a third slot having an address that is successive to the address of the second slot. Since there is no execution result removed from the first completion queue CQ1, the first completion head pointer C1H may be maintained at an initial position.

For example, fourth to sixth commands S2_4 to S2_6 may be sequentially enqueued to fourth to sixth slots of the second submission queue SQ2, respectively. As the fourth to sixth commands S2_4 to S2_6 are enqueued, the second submission tail pointer S2T may be updated to indicate a seventh slot having an address that is successive to an address of the sixth address.

The first slot of the second submission queue SQ2 may be emptied. For example, as the storage device 1300 fetches the first command S2_1, a first slot in which the first command S2_1 is registered may be emptied. The second submission head pointer S2H may be updated to indicate a second slot having an address that is successive to the address of the first slot. The storage device 1300 may execute the fetched first command S2_1.

When the storage device 1300 completes execution of the fetched first command S2_1, the storage device 1300 may enqueue a first execution result C2_1 to the second completion queue CQ2. As the first execution result C2_1 is enqueued, the second completion tail pointer C2T may be updated to indicate a second slot having an address that is successive to the address of the first slot. Since there is no execution result removed from the second completion queue CQ2, the second completion head pointer C2H may be maintained at an initial position.

Referring to FIGS. 1 to 4 and FIG. 8, at the first and second submission queues SQ1 and SQ2, slots to which a new command is enqueued are represented by dots (i.e., darker shading) and slots where a registered command is removed are represented by diagonal lines (i.e., lighter shading). At the first and second completion queues CQ1 and CQ2, slots to which new execution results are enqueued are represented by dots (i.e., darker shading) and slots where a registered execution result is removed are represented by diagonal lines (i.e., lighter shading).

For example, an eighth command S1_8 may be enqueued to an eighth slot of the first submission queue SQ1. The eighth slot indicated by the first submission tail pointer S1T may have the largest address within the address range of the first submission queue SQ1. Thus, as the eighth command S1_8 is enqueued, the first submission tail pointer S1T may be updated to indicate the first slot having the smallest address within the address range of the first submission queue SQ1.

Third to fifth slots of the first submission queue SQ1 may be emptied. For example, as the storage device 1300 fetches third to fifth commands S1_3 to S1_5, the first to fifth slots of the first submission queue SQ1 may be emptied. The first submission head pointer S1H may be updated to indicate a sixth slot having an address that is successive to the address of the fifth slot. The storage device 1300 may execute the fetched third to fifth commands S1_3 to S1_5.

When the storage device 1300 completes the execution of the fetched third to fifth commands S1_3 to S1_5, the storage device 1300 may sequentially enqueue third to fifth execution results C1_3 to C1_5 to the first completion queue CQ1, respectively. As the third to fifth execution results C1_3 to C1_5 are enqueued, the first completion tail pointer C1T may be updated to indicate a sixth slot having an address that is successive to the address of the fifth slot.

The first slot of the first completion queue CQ1 may be emptied. For example, as the host device performs completion-processing on the first execution result C1_1, the first slot of the first completion queue CQ1 may be emptied. The first completion head pointer C1H may be updated to indicate a second slot having an address that is successive to the address of the first slot.

The enqueueing to the first completion queue CQ1 is performed by the storage device 1300, and the removal of an execution result from the first completion queue CQ1 may be performed by the host device. According to at least one example embodiment of the inventive concepts, the enqueueing and the removal associated with the first completion queue CQ1 may be performed independently of each other.

For example, seventh to ninth commands S2_7 to S2_9 may be sequentially enqueued to seventh, eighth, and first slots of the second submission queue SQ2, respectively. As the seventh to ninth commands S2_7 to S2_9 may be enqueued, the second tail pointer S2T may be updated to indicate a second slot having an address that is successive to the address of the first slot.

The second to sixth slots of the second submission queue SQ2 may be emptied. For example, as the storage device 1300 fetches the second to sixth commands S2_2 to S2_6, the second to sixth slots of the second submission queue SQ2 may be emptied. The second submission head pointer S2H may be updated to indicate a seventh slot having an address that is successive to the address of the sixth slot. The storage device 1300 may execute the fetched second to sixth commands S2_2 to S2_6.

When the storage device 1300 completes the execution of the second to sixth commands S2_2 to S2_6, the storage device 1300 may enqueue second to sixth execution results C2_2 to C2_6 to the second to sixth slots. As the second to sixth execution results C2_2 to C2_6 are enqueued, the second completion tail pointer C2T may be updated to indicate a seventh slot having an address that is successive to the address of the sixth slot.

A first slot of the second completion queue CQ2 may be emptied. For example, as the host device performs completion-processing on a first execution result C2_1, the first slot of the second completion queue CQ2 may be emptied. The second completion head pointer C2H may be updated to indicate a second slot having an address that is successive to an address of the first slot.

Referring to FIGS. 1 to 4 and FIG. 9, at the first and second submission queues SQ1 and SQ2, slots to which a new command is enqueued are represented by dots (i.e., darker shading) and slots where registered commands are removed are represented by diagonal lines (i.e., lighter shading). At the first and second completion queues CQ1 and CQ2, slots to which new execution results are enqueued are represented by dots and slots where a registered execution result is removed are represented by diagonal lines.

For example, a ninth command S1_9 may be enqueued to a first slot of the first submission queue SQ1. As the ninth command S1_9 is enqueued, the first submission tail pointer S1T may be updated to indicate a second slot having an address that is successive to the address of the first slot.

Sixth and seventh slots of the first submission queue SQ1 may be emptied. For example, as the storage device 1300 fetches the sixth and seventh commands S1_6 and S1_7, the sixth and seventh slots of the first submission queue SQ1 may be emptied. The first submission head pointer S1H may be updated to indicate an eighth slot having an address that is successive to the address of the seventh slot. The storage device 1300 may execute the fetched sixth and seventh commands S1_6 and S1_7.

When the storage device 1300 completes execution of the fetched sixth and seventh commands S1_6 and S1_7, the storage device 1300 may sequentially enqueue sixth and seventh execution results C1_6 and C1_7 to the sixth and seventh slots, respectively. As the sixth and seventh execution results C1_6 and C1_7 are enqueued, the first completion tail pointer C1T may be updated to indicate an eighth slot having an address that is successive to the address of the seventh slot.

Second and third slots of the first completion queue CQ1 may be emptied. For example, as the host device performs completion-processing on the second and third execution results C1_2 and C1_3, the second and third slots of the first completion queue CQ1 may be emptied. The first completion head pointer C1H may be updated to indicate a fourth slot having an address that is successive to the address of the third slot.

For example, a tenth command S2_10 may be enqueued to the second slot of the second submission queue SQ2. As the tenth command S2_10 is enqueued, the second submission tail pointer S2T may be updated to indicate a third slot having an address that is successive to the address of the second slot.

Seventh and eighth of the second submission queue SQ2 may be emptied. For example, as the storage device 1300 may fetch the seventh and eighth commands S2_7 and S2_8, the seventh and eighth slots of the second submission queue SQ2 may be emptied. The second submission pointer S2H may be updated to indicate a first slot having the smallest address within the address range of the second submission queue SQ2. The storage device 1300 may execute the fetched seventh and eighth commands S2_7 and S2_8.

When the storage device 1300 completes execution of the fetched seventh and eighth commands S2_7 and S2_8, the storage device 1300 may enqueue seventh and eighth execution results C2_7 and C2_8 to the seventh and eighth slots. As the seventh and eighth execution results C2_7 and C2_8 are enqueued, the second completion tail pointer C2T may be updated to indicate a first slot having the smallest address within the address range of the second completion queue CQ2.

When an eighth execution result C2_8 is enqueued to the second completion queue CQ2, only one of the first to eighth slots of the second completion queue CQ2 is empty. When only one slot is empty, a corresponding queue is determined to be full. For example, when a head pointer and a tail pointer indicate successive addresses, and an address of the head pointer is greater than that of the tail pointer, a corresponding queue is determined to be full. Further, as another example, when the head pointer indicates the smallest address within the address range of a queue and the tail pointer indicates the largest address within the address range of the queue, the corresponding queue is determined to be full.

In FIG. 9, the second completion queue CQ2 is determined to be full and the second completion queue CQ2 cannot enqueue an execution result any more.

For example, although the second completion queue CQ2 is full, a command may be fetched from the second submission queue SQ2 based on a round robin scheduling scheme. For example, a first thread of the storage device 1300 may fetch a command from the second submission queue SQ2 and execute the fetched command. However, since the second completion queue CQ2 is a full queue, the first thread of the storage device 1300 does not enqueue an execution result of the fetched command to the second completion queue CQ2 and stands by. If the storage device 1300 supports only a single thread, the operation of the storage device 1300 may stop until the second completion queue CQ2 is emptied by the host device.

If the storage device 1300 supports multi-threading, a second thread of the storage device 1300 may fetch a command based on the round robin scheduling. When the second submission queue SQ2 is selected, the second thread may fetch a command from the second submission queue SQ2 and execute the fetched command. However, since the second completion queue is a full queue, the second thread of the storage device 1300 does not enqueue an execution result of the fetched command to the second completion queue CQ2 and stands by.

As described above, if the storage device 1300 supports only a single thread, the operation of the storage device 1300 stops when a single completion queue becomes full. If the storage device 1300 supports multi-threading, the number of usable threads decreases when a single completion queue becomes full. That is, operation performance of the storage device 1300 is degraded gradually.

The degradation in the operation performance may continue until at least one slot of a full queue is emptied. In other words, the degradation in the operation performance continues until a full completion queue is restored.

In order to prevent a full completion queue from degrading the operation performance of the storage device 1300, the storage device 1300 according to at least one example embodiment of the inventive concepts may adjust a command fetch manner based on a round robin (i.e., based on round robin scheduling) depending on whether the completion queue is full.

Figure 10:
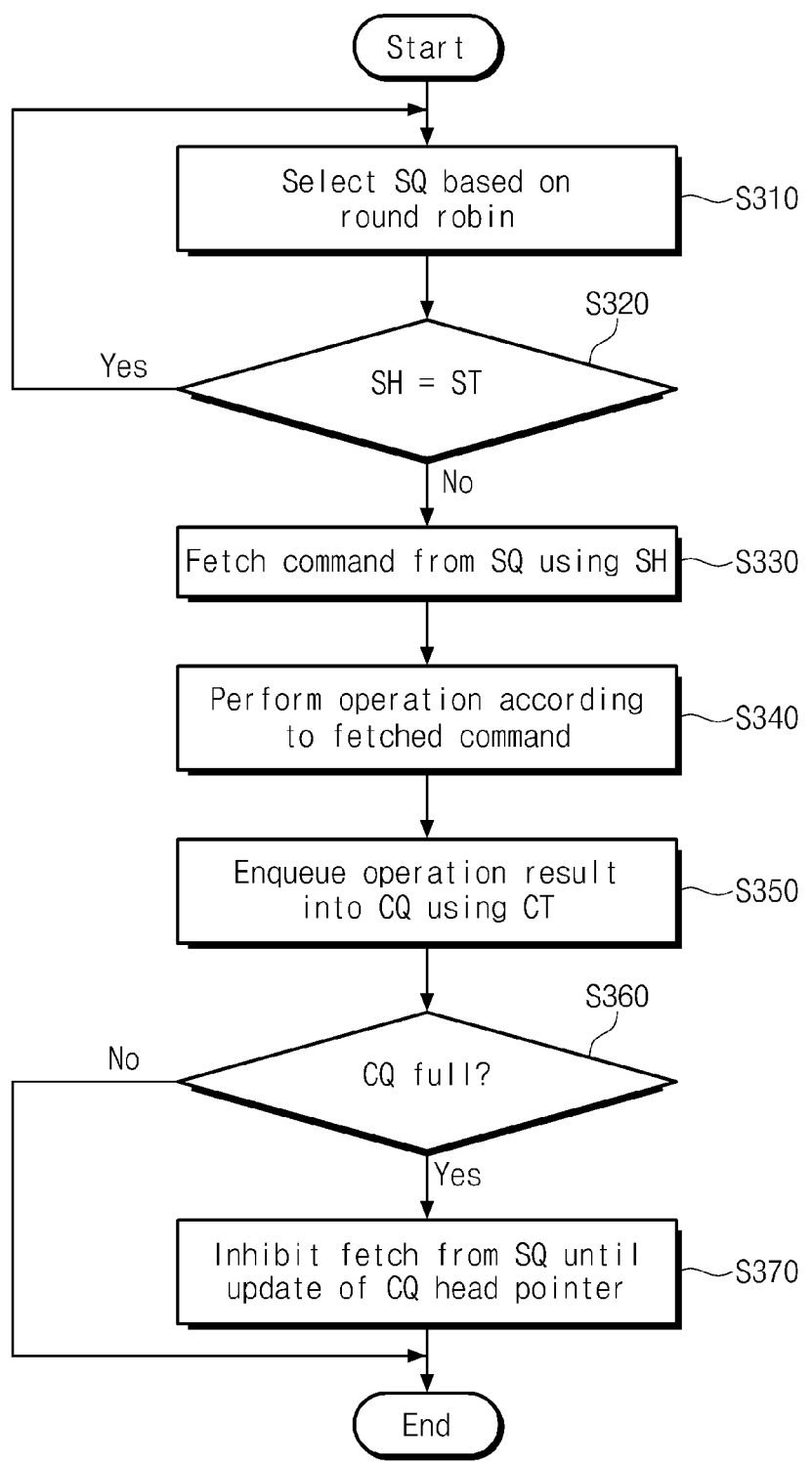
FIG. 10 is a flowchart summarizing another example of an operating method of a storage device.

FIG. 10 is a flowchart summarizing another example of an operating method of the storage device 1300. Referring to FIGS. 1 to 3 and FIG. 10, the storage device 1300 selects one of a plurality of submission queues SQ based on round robin scheduling (S310).

The storage device 1300 determines whether there is a command registered in the selected submission queue SQ (S320). For example, when a submission head pointer SH and a submission tail pointer ST of the selected submission queue SQ indicate the same slot (e.g., address) of the selected submission queue SQ, the storage device 1300 may determine that there is no command registered in the selected submission queue SQ. When there is no command registered in the selected submission queue SQ, the flow proceeds to S310 to select the next submission queue SQ. When there is a command registered in the selected submission queue SQ, the flow proceeds to S330.

The storage device 1300 fetches a command from the submission queue SQ using the submission head pointer SH (S330). For example, the storage device 1300 may fetch a command registered in a slot of the submission queue SQ indicated by the submission head pointer SH from the RAM 1200.

The storage device 1300 executes the fetched command (S340).

The storage device 1300 enqueues an execution result of the fetched command to a selected completion queue CQ corresponding to the selected submission queue SQ using the completion tail pointer CT (S350).

The storage device 1300 determines whether the selected queue CQ is full (S360). As used herein, the term "full completion queue" refers to a completion queue that meets the criteria for the storage device 1300 to determine the completion queue to be full; and the term "normal completion queue" refers to a completion queue that does not meet the criteria for the storage device 1300 to determine the completion queue to be full. Example criteria will now be discussed. For example, when the completion head pointer CH and the completion tail pointer CDT indicate successive addresses (e.g., addresses of the RAM 1200) and an address indicated by the completion tail pointer CT is smaller than an address indicated by the completion head pointer CH, the storage device 1300 may determine that the selected completion queue CQ is full (i.e., a full completion queue). As another example, when the completion head pointer CH indicates the smallest address within the address range of the selected completion queue CQ and the completion tail pointer CT indicates the largest address within the address range of the selected completion queue CQ, the storage device 1300 may determine that the selected completion queue CQ is full (i.e., a full completion queue). As another example, if the storage device 1300 determines, with respect to slots of a selected completion queue CQ, that a total number of slots not storing data (e.g., an execution result) is less than a reference number (e.g., 2 or 1), the storage device 1300 may determine that the selected queue CQ is full (i.e., a full completion queue).

When the completion queue CQ is determined to be full, the storage device 1300 inhibits a command from being fetched from a submission queue SQ corresponding to the full completion queue CQ until at least one of slots of the full completion queue CQ is emptied. As used herein, the term "full submission queue" refers to a submission queue that corresponds to a full submission queue; and the term "normal submission queue" refers to a submission queue that corresponds to a submission queue that is not a full submission queue. For example, the storage device 1300 may inhibit a command from being fetched from a submission queue SQ corresponding to the full completion queue CQ until a completion head pointer associated with the full completion queue CQ is updated.

For example, when selecting the submission queue SQ based on round robin scheduling, the storage device 1300 may inhibit selection of the submission queue SQ corresponding to the full completion queue CQ. When selecting the submission queue SQ based on the round robin scheduling, the storage device 1300 may omit selection of the submission queue SQ corresponding to the full completion queue CQ.

If the selection of the submission queue SQ corresponding to the full completion queue CQ is inhibited or omitted, the operation of the storage device 1300 is prevented from being stopped or operation performance of the storage device 1300 is prevented from being deteriorated.

Figure 11:
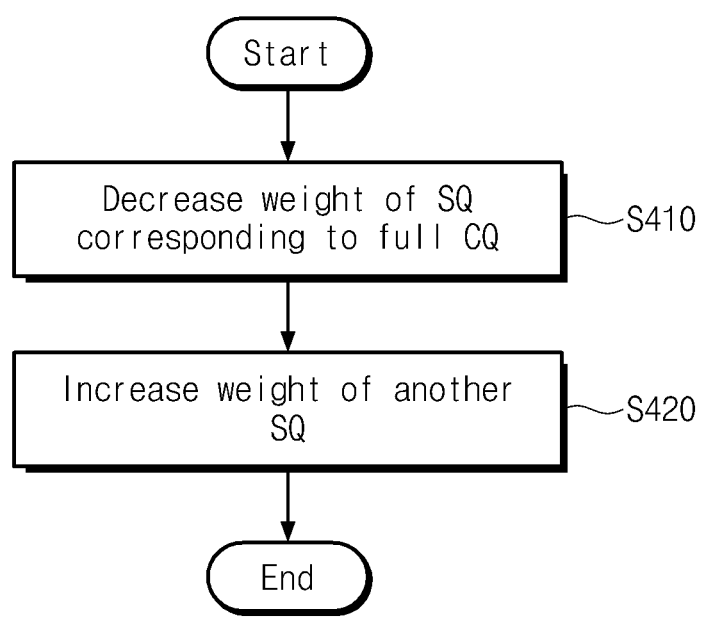
FIG. 11 is a flowchart summarizing an example of inhibiting or omitting selection of a submission queue corresponding to a full completion queue.

FIG. 11 is a flowchart summarizing an example of inhibiting or omitting selection of a submission queue SQ corresponding to a full completion queue CQ. Referring to FIGS. 1, 2, and 11, a weight of the submission queue SQ corresponding to the full completion queue CQ decreases (S410). A weight of another submission queue SQ increases (S420). Weight values of the submission queues may be variables calculated by and stored in the host device 1000 and/or storage device 1300.

In some embodiments, the storage device 1300 may use a weight when selecting the submission queue SQ based on a round robin scheduling scheme. For example, a weight of a first submission queue S1Q may be i and a weight of a second submission queue S2Q may be j. The storage device 1300 may select each of the first and second submission queues S1Q and S2Q at a ratio of i to j.

When there is a full completion queue CQ, the weight of the submission queue SQ corresponding to the full completion queue CQ may be set to '0'. That is, the submission queue SQ corresponding to the full completion queue CQ may be excluded from a selection manner based on the round robin scheduling. In some embodiments, a submission queue SQ with an increasing weight may be selected with reference to the submission queue SQ or the completion queue CQ.

For example, a weight of a submission queue SQ corresponding to a completion queue CQ with the greatest number of empty slots may increase. The storage device 1300 may detect the completion queue CQ with the greatest number of empty slots with reference to completion head pointers CH and completion tail pointers CT. The storage device 1300 may increase a weight of a submission queue SQ corresponding to the detected completion queue CQ.

As another example, a weight of a submission queue SQ with the greatest number of registered commands may increase. The storage device 1300 may detect the submission queue SQ with the greatest number of registered commands with reference to the submission head pointers SH and the submission tail pointers ST. The storage device 1300 may increase a weight of the detected submission queue SQ.

As another example, the storage device 1300 may select a submission queue SQ whose weight is to increase, with reference to all the completion queues CQ and all the submission queues SQ. For example, the storage device 1300 may increase a weight of a submission queue SQ that (i) corresponds to the completion queue CQ with the greatest number of empty slots, and (ii) has the greatest number of registered commands.

Figure 12:
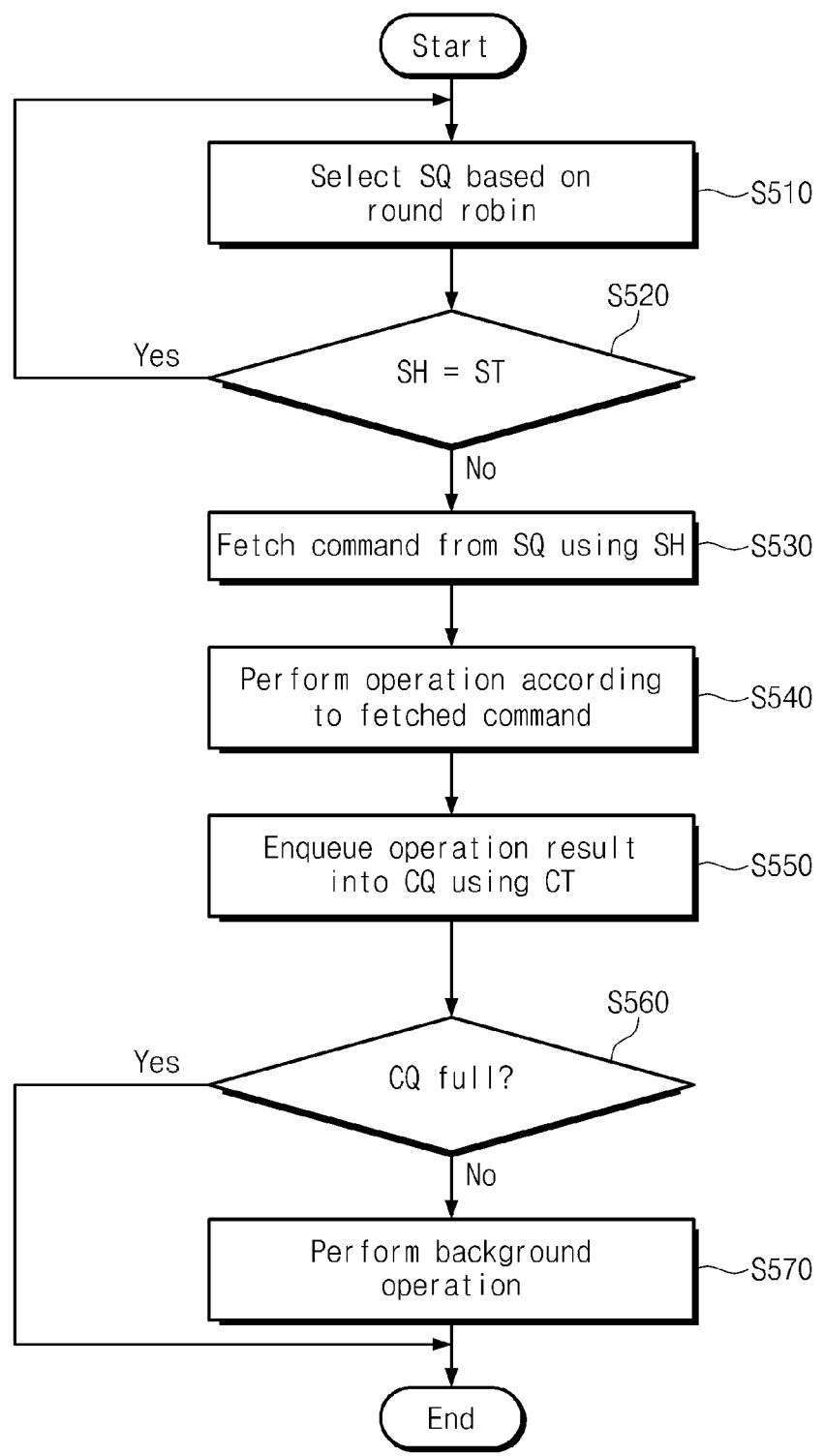
FIG. 12 is a flowchart summarizing another example of an operating method of a storage device.

FIG. 12 is a flowchart summarizing another example of an operating method of the storage device 1300. Since S510 to S550 in FIG. 12 are performed in the same manner as S310 to S350 in FIG. 10, duplicate explanations will be omitted.

Referring to FIGS. 1, 2, and 12, the storage device 1300 determines whether a selected completion queue CQ is full (S560).

When the completion queue CQ is determined to be full, the storage device 1300 performs a background operation (S570). For example, the storage device 1300 may perform a background operation reserved to be performed for an idle time. The term "idle time" refers to a time when there is no operation performed by the storage device 1300 because there is no command from a host. For example, the storage device 1300 may perform garbage collection. The garbage collection may be an operation to copy valid data of a first memory block storing the valid data and invalid data to an empty second block and erase the first block. The garbage collection may be an operation to obtain an empty memory block.

At least one of slots of a full completion queue may be emptied during the background operation such as garbage collection.

Figure 13:
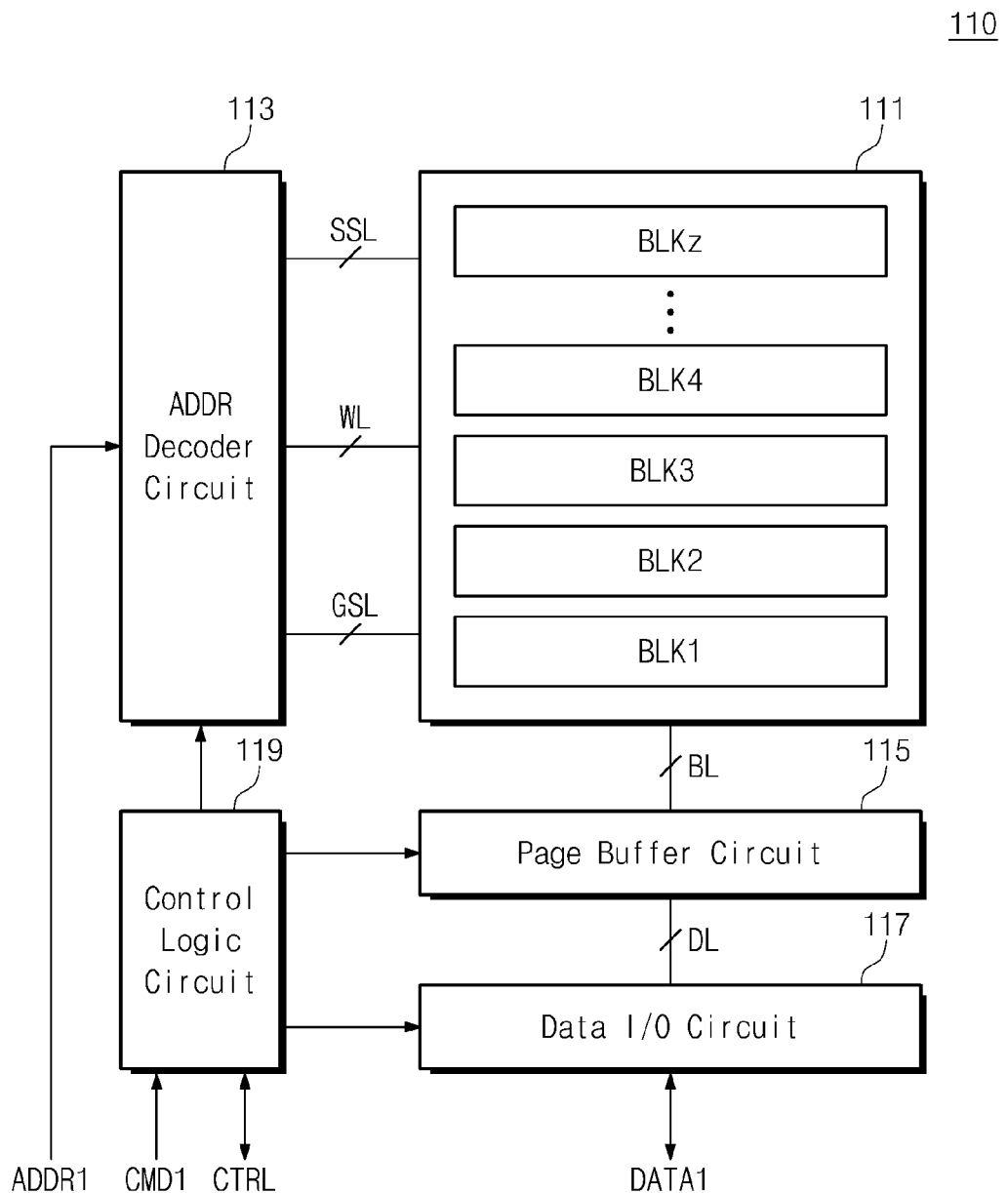
FIG. 13 is a block diagram of a nonvolatile memory according to at least one example embodiment of the inventive concepts.

FIG. 13 is a block diagram of a nonvolatile memory 110 according to at least one example embodiment of the inventive concepts. Referring to FIGS. 2 and 13, the nonvolatile memory device 110 includes a memory cell array 111, an address decoder 113, a data input/output (I/O) circuit 117, and a control logic circuit 119.

The memory cell array 111 may include a plurality of memory blocks BLK1 to BLKz. Each of the memory blocks BLK1 to BLKz includes a plurality of memory cells. Each of the memory blocks BLK1 to BLKz may be connected to the address decoder circuit 113 through at least one ground selection line GSL, a plurality of wordlines WL, and at least one string selection line SSL. Each of the memory blocks BLK1 to BLKz may be connected to a page buffer circuit 115 through a plurality of bitlines BL. The memory blocks BLK1 to BLKz may be commonly connected to the bitlines BL. Memory cells of the memory blocks BLK1 to BLKz may have the same structure. In some embodiments, each of the memory blocks BLK1 to BLKz may be a unit of an erase operation. Memory cells of the memory cell array 111 may be erased in units of a single memory block. According to at least some example embodiments of the inventive concepts, memory blocks belonging to a single memory block may be erased at the same time. According to at least some example embodiments of the inventive concepts, each of the memory blocks BLK1 to BLKz may be divided into a plurality of sub-blocks. Each of the sub-blocks may be a unit of an erase operation.

The address decoder circuit 113 is connected to the memory cell array 111 through a plurality of ground selection lines GSL, a plurality of wordlines WL, and a plurality of string selection lines SSL. The address decoder circuit 113 operates according to the control of the control logic circuit 119. The address decoder circuit 113 may receive a first address ADDR1 from the memory controller 120. The address decoder 113 may decode the received first address ADDR1 and control voltages applied to the wordlines WL according to the decoded address.

For example, during a program operation, the address decoder circuit 113 may apply a program voltage VGPM to a selected wordline of a selected memory block indicated by the first address ADDR1 and apply a pass voltage VPASS to unselected wordlines of the selected memory block. During a read operation, the address decoder circuit 131 may apply a select read voltage VRD to the selected wordline of the selected memory block indicated by the first address ADDR1 and apply an unselect read voltage VREAD to unselected wordlines of the selected memory. During an erase operation, the address decoder circuit 113 may apply an erase voltage (e.g., ground voltage) to wordlines of the selected memory block indicated by the first address ADDR1.

The page buffer circuit 115 is connected to the memory cell array 111 through a plurality of bitlines BL. The page buffer circuit 115 is connected to the data I/O circuit 117 through a plurality of data lines DL. The page buffer circuit 115 operates according to the control of the control logic 119.

The page buffer circuit 115 may store data to be programmed into memory cells of the memory cell array 111 or data read from the memory cells. During a program operation, the page buffer circuit 115 may store the data to be programmed into the memory cells. The page buffer circuit 115 may bias a plurality of bitlines BL based on stored data. The page buffer circuit 115 may function as a write driver during the program operation. During a read operation, the page buffer circuit 115 may sense voltages of the bitlines BL and store a sensing result. The page buffer circuit 115 may function as a sense amplifier during the read operation.

The data I/O circuit 117 is connected to the page buffer circuit 115 through a plurality of data lines DL. The data I/O circuit 117 may exchange first data DATA1 with the memory controller 120.

The data I/O circuit 117 may temporarily store the first data DATA1 received from the memory controller 220. The data I/O circuit 117 may transmit the stored data to the page buffer circuit 115. The data I/O circuit 117 may temporarily store data DATA transmitted from the page buffer circuit 115. The data I/O circuit 117 may transmit the stored data DATA to the memory controller 220. The data I/O circuit 117 may function as a buffer memory.

The control logic circuit 119 receives a first command CMD1 and a control signal CTRL from the memory controller 220. The control logic 119 may decode the received first command CMD1 and control the overall operation of the nonvolatile memory 110 according to the decoded command.

In some embodiments, during a read operation, the control logic circuit 119 may generate and output a data strobe signal DQS from a read enable signal /RE of the received control signal CTRL. During a write operation, the control logic circuit 119 may generate and output the data strobe signal DQS from the data strobe signal DQS of the received control signal CTRL.

FIG. 14 is a circuit diagram illustrating an example configuration of a memory block BLKa according to at least one example embodiment of the inventive concepts. As illustrated, the memory block BLKa includes a plurality of cell strings CS11 to CS21 and CS12 to CS22. The cell strings CS11 to CS21 and CS12 to CS22 may be arranged in a row direction and a column direction to form rows and columns.

For example, the cell strings CS11 and CS12 arranged in the row direction may form a first row, and the cell strings CS21 and CS22 arranged in the row direction may form a second row. The cell strings CS11 and CS21 arranged in the column direction may form a first column, and the cell strings CS12 and CS22 arranged in the column direction may form a second column.

Each cell string may include a plurality of cell transistors. The cell transistors include ground selection transistors GSTa and GSTb, memory cells MC1 to MC6, and string selection transistors SSTa and SSTb. The ground selection transistors GSTa and GSTb, the memory cells MC1 to MC6, and the string selection transistors SSTa and SSTb of each cell string may be stacked in a direction perpendicular to a plane on which the cell strings CS11 to CS21 and CS12 to CS22 are arranged in a matrix of rows and columns (e.g., a plane on a substrate of the memory block BLKb).

The plurality of cell transistors may be charge trap type transistors having threshold voltages that vary depending on the amount of charged trapped to an insulating layer.

Lowermost ground selection transistors GSTa may be commonly connected to the common source line CSL.

The ground selection transistors GSTa and GSTb of the cell strings CS11 to CS21 and CS12 to CS22 may be commonly connected to the ground selection line GSL.

In some embodiments, ground selection transistors of the same height (or order) may be connected to the same ground selection line, and ground selection transistors of different heights (or orders) may be connected to different ground selection lines. For example, ground selection transistors GSTa of first height may be commonly connected to a first ground selection line, and ground selection transistors of second height may be commonly connected to a second ground selection line.

In some embodiments, ground selection transistors of the same row may be connected to the same ground selection line, and ground selection transistors of different rows may be connected to different ground selection lines. For example, ground selection transistors GSTa and GSTb of cell strings CS11 and CS12 of a first row may be connected to a first ground selection line, and ground selection lines GSTa and GSTb of cell strings CS21 and CS22 of a second row may be connected to a second ground selection line.

Memory cells disposed at the same height (or order) from a substrate (or ground selection transistors GST) may be connected to a single wordline, and memory cells disposed at different heights (or orders) may be connected to different wordlines WL1 to WL6, respectively. For example, memory cells MC1 are commonly connected to the wordline WL1. Memory cells MC3 are commonly connected to the wordline WL4. Memory cells MC4 are commonly connected to the wordline WL5. Memory cells MC6 are commonly connected to the wordline WL6.

In a first string selection transistor SSTa of the same height (or order) of the cell strings CS11 to CS21 and CS12 to CS22, first string selection transistors SSTa of different rows are connected to different string selection lines SSL1a to SSL2a, respectively. For example, first string selection transistors SSTa of the cell strings CS11 and CS12 are commonly connected to a string selection line SSL1a. First string selection transistors SSTa of the cell strings CS21 and CS22 are commonly connected to a string selection line SSL2a.

In a second string selection transistor SSTb of the same height (or order) of the cell strings CS11 to CS21 and CS12 to CS22, second string selection transistors SSTb of different rows are connected to different string selection lines SSL1b to SSL2b, respectively. For example, second string selection transistors SSTb of the cell strings CS11 and CS12 are commonly connected to a string selection line SSL1b. First string selection transistors SSTb of the cell strings CS21 and CS22 are commonly connected to a string selection line SSL2b.

That is, cell strings of different rows are connected to different string selection lines. String selection transistors of the same height (or order) of the same row are connected to the same string selection line. String selection transistors of different heights (or orders) of the same row are connected to different string selection lines.

In some embodiments, string selection transistors of cell strings of the same row may be connected to a single string selection line. For example, string selection transistors SSTa and SSTb of a first row may be commonly connected to a single string selection line. String selection transistors SSTa and SSTb of cell strings CS21 and CS22 of a second row may be commonly connected to a single string selection line.

Columns of a plurality of cell strings CS11 to CS21 and CS12 to CS22 are connected to different bitlines BL1 and BL2, respectively. For example, string selection transistors SSTb of cell strings CS11 to CS21 of a first column are commonly connected to a bitline BL1. String selection transistors SST of cell strings CS12 to CS22 of a second column are commonly connected to a bitline BL2.

The cell strings CS11 and CS12 may form a first plane. The cell strings CS21 and CS22 may form a second plane.

In the memory block BLKa, write and read operations may be performed in units of rows. For example, a single plane of the memory block BLKa may be selected by string selection lines SSL1a, SSL1b, SSL2a, and SSL2b. When the string selection lines SSL1a and SSL1b are supplied with a turn-on voltage and the string selection lines SSL2a and SSL2b are supplied with a turn-off voltage, cell strings CS11 and CS12 of the first plane are connected to the bitlines BL1 and BL2, i.e., the first plane is selected. When the string selection lines SSL2a and SSL2b are supplied with a turn-on voltage and the string selection lines SSL1a and SSL1b are supplied with a turn-off voltage, cell strings CS21 and CS22 of the second plane are connected to the bitlines BL1 and BL2, i.e., the second plane is selected. In the selected plane, a single row of the memory cells MC may be selected by the wordlines WL1 to WL6. In the selected row, a write or read operation may be performed.

In the memory block BLKa, an erase operation may be performed units of memory blocks or sub-blocks. When the erase operation is performed in units of memory blocks, all memory cells MC of the memory block BLKa may be erased at the same time according to a single erase request. When the erase operation is performed in units of sub-blocks, some of the memory cells MC of the memory block BLKa may be erased at the same time according to a single erase request and the others may be erase-inhibited. A wordline connected to erased memory cells may be supplied with a low voltage (e.g., ground voltage), and a wordline connected to erase-inhibited memory cells may be floated.

The memory block BLKa shown in FIG. 14 is an example. The present inventive concepts are not limited to the memory block BLKa shown in FIG. 14. For example, the number of rows of cell strings may increase or decrease. As the number of the rows of the cell strings varies, the number of string selection lines or the number of ground selection lines, and the number of cell strings connected to a single bitline may also vary.

The number of columns of cell strings may increase or decrease. As the number of columns of cell strings varies, the number of bitlines connected to the columns of the cell strings and the number of cell strings connected to a single string selection line may also vary.

The height of cell strings may increase or decrease. For example, the number of ground selection transistors, memory cells or string selection transistors stacked on the respective cell strings may increase or decrease.

According to at least one example embodiment of the inventive concepts, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

According to at least one example embodiment of the inventive concepts, the 3D memory array includes vertical NAND strings that are vertically oriented such that at least one memory cell is located over another memory cell. The at least one memory cell may comprise a charge trap layer. Each vertical NAND string further includes at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

Figure 15:
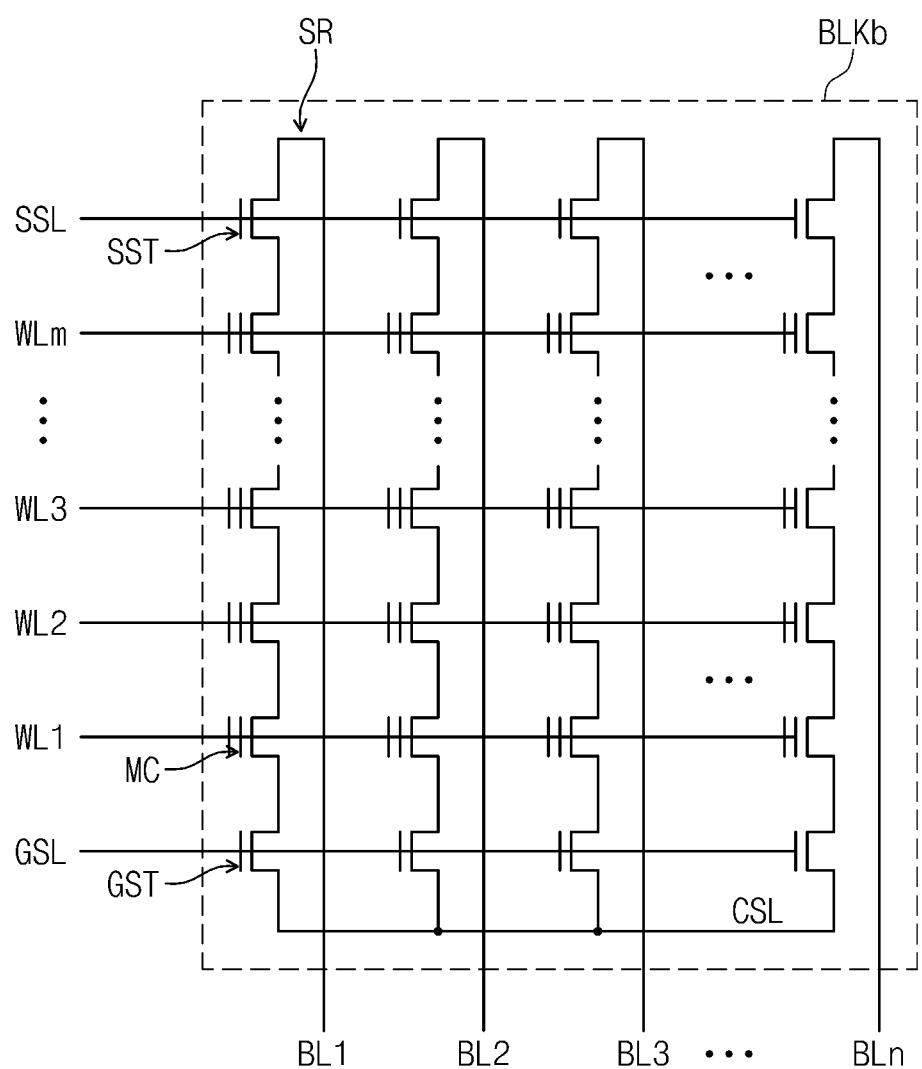
FIG. 15 is a circuit diagram of a memory block according to at least another example embodiment of the inventive concepts.

FIG. 15 is a circuit diagram of a memory block BLKb according to at least another example embodiment of the inventive concepts. As illustrated, the memory block BLKb includes a plurality of strings SR. Each SR includes a ground selection transistors GST, memory cells MC, and string selection transistors SST.

A ground selection transistor GST of each string SR is coupled between memory cells MC and a common source line CSL. The ground selection transistors of the strings SR are commonly connected to the common source line CSL.

A string selection transistor SST of each string SR is coupled between memory cells MC and a bitline BL. The string selection transistors SST of the strings SR are connected to a plurality of bitlines BL1 to BLn, respectively.

In each string SR, a plurality of memory cells are provided between a ground selection transistor GST and a string selection transistor SST. In each string SR, a plurality of memory cells may be connected in series.

In the plurality of strings SR, memory cells MC disposed in the same order from the common source line CSL may be commonly connected to a single wordline. The memory cells MC of the strings SR may be connected to a plurality of wordlines WL1 to WLm.

In the memory block BLKb, an erase operation may be performed in units of memory blocks. When the erase operation is performed in units of memory blocks, all the memory cells MC of the memory block BLKb may be erased at the same time according to a single erase request.

Figure 16:
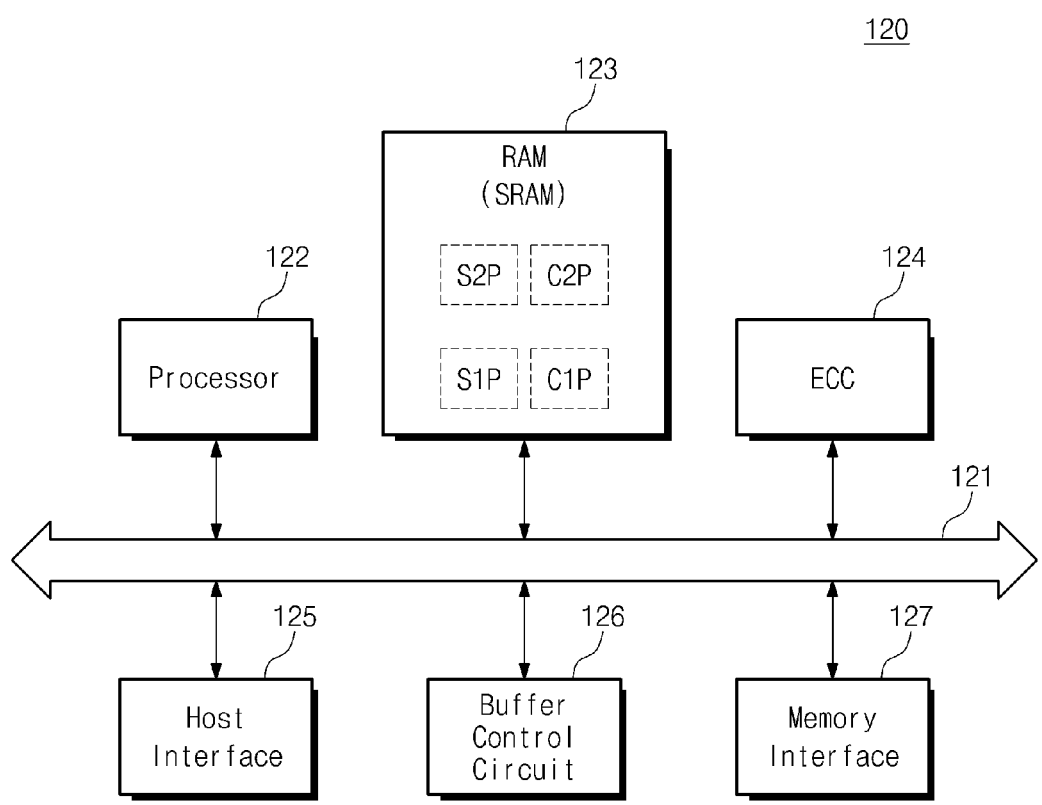
FIG. 16 is a block diagram of a memory controller according to at least one example embodiment of the inventive concepts.

FIG. 16 is a block diagram of a memory controller 120 according to at least one example embodiment of the inventive concepts. As illustrated, the memory controller 120 includes a bus 121, a processor 122, a RAM 123, an error correction block (ECC) 124, a host interface 125, a buffer control circuit 126, and a memory interface 127.

The bus 121 is configured to provide a channel between components.

The processor 122 may control the overall operation of the memory controller 120 and perform a logical operation. The processor 122 may communicate with an external host (see FIG. 1) through the host interface 125. The processor 122 may store a second command CMD2 or a second address ADDR2 received through the host interface 125 in the RAM 123. The processor 122 may generate a first command CMD1 or a first address ADDR1 according to the second command CMD2 or the second address ADDR2 stored in the RAM 123 and output the first command CMD1 and the first address ADDR1 through the memory interface 127.

The processor 122 may output second data DATA2 received through the host interface 125 through the buffer control circuit 126 or store the second data DATA2 in the RAM 123. The processor 122 may output data stored in the RAM 123 or data received through the buffer control circuit 126 as first data DATA1 through the memory interface 127. The processor 122 may store the first data DATA1 received through the memory interface 127 or output the first data DATA1 through the buffer control circuit 126. The processor 122 may output data stored in the RAM 123 or data received through the buffer control circuit 126 as the second data DATA2 through the host interface 125 or as the first data DATA1 through the memory interface 127.

The RAM 123 may be used as a working memory, a cache memory or a buffer memory of the processor 122. The RAM 123 may store codes and commands executed by the processor 122. The RAM 123 may store data processed by the processor 122. The RAM 123 may include a static RAM (SRAM).

As described with reference to FIGS. 1 to 12, the RAM 123 may store a first submission pointer S1P corresponding to a first submission queue S1Q, a first completion pointer C1P corresponding to a first completion queue C1Q, a second submission pointer S2P corresponding to a second submission queue S2Q, and a second completion pointer C2P corresponding to a second completion queue C2Q.

The ECC 124 may perform error correction. The ECC 124 may generate an error correction code (e.g., parity) for performing error correction based on the first data DATA1 to be output to the memory interface 127 or the second data DATA2 received from the host interface 125. The first data and the parity may be output through the memory interface 127. The ECC 124 may perform error correction of the received first data DATA1 using the first data DATA1 and the parity received through the memory interface 127. In some embodiments, the ECC 124 may be included in the memory interface as a component of the memory interface 127.

The host interface 125 is configured to communicate with an external host device 100 (see FIG. 1) according to the control of the processor 122. The host interface 125 may receive a second command CMD2 and a second address ADDR2 from the external host device 100 and exchange the second data DATA2 with the external host device.

The host interface 125 may be configured to perform communication based on at least one of various communication protocols such as USB (Universal Serial Bus), SATA (Serial AT Attachment), SAS (Serial Attached SCSI), HSIC (High Speed Interchip), SCSI (Small Computer System Interface), Firewire, PCI (Peripheral Component Interconnection), PCIe (PCI express), NVMe (NonVolatile Memory express), UFS (Universal Flash Storage), SD (Secure Digital), MMC (MultiMedia Card), and eMMC (embedded MMC).

The buffer control circuit 126 is configured to control the RAM 130 (see FIG. 1) according to the control of the processor 122. The buffer control circuit 126 may write data into the RAM 130 and read data from the RAM 130.

The memory interface 127 is configured to communicate with the nonvolatile memory 110 (see FIG. 1) according to the control of the processor 122. The memory interface 127 may transmit the first command CMD1 and the first address ADDR1 to the nonvolatile memory 110 and exchange the first data DATA1 and a control signal CTRL with the nonvolatile memory 110.

In some embodiments, the storage device 110 may not be provided with the RAM 130. That is, the storage device 110 may not include a separate memory outside the memory controller 120 and the nonvolatile memory 110. In this case, the memory controller 120 may not be provided with the buffer control circuit 126 and the function of the RAM 130 may be performed by the RAM 123 in the memory controller 120.

In some embodiments, the processor 122 may control the memory controller 120 using codes. The processor 122 may load codes from the nonvolatile memory (e.g., ROM) provided in the memory controller 120. In other embodiments, the processor 122 may load codes received from the memory interface 127.

In some embodiments, the bus 121 of the memory controller 120 may be classified into a control bus and a data bus. The data bus may be configured to transmit data in the memory controller 120, and the control bus may be configured to transmit control information such as a command and an address in the memory controller 120. The data bus and the control bus may be separated from each other and may not interfere with each other or may not have an influence on each other. The data bus may be connected to the host interface 125, the buffer control circuit 126, the ECC 124, and the memory interface 127. The control bus may be connected to the host interface 125, the processor 122, the buffer control circuit 126, the RAM 123, and the memory interface 127.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An operating method of a storage device including a nonvolatile memory and a memory controller configured to control the nonvolatile memory, the operating method comprising:
   selecting a submission queue from among a plurality of submission queues;
   fetching, from the selected submission queue, a command for accessing the storage device;
   executing the fetched command;
   outputting an execution result of the fetched command to a selected completion queue corresponding to the selected submission queue; and
   inhibiting, when a full completion queue exist, the selecting from a full submission queue corresponding to the full completion queue among the plurality of submission queues until the full completion queue becomes a normal completion queue,
   the plurality of submission queues being sequentially selected in accordance with a round robin scheduling,
   the plurality of submission queues having a plurality of weights, respectively,
   selection frequencies of the plurality of submission queues being based on the weights,
   the inhibiting including reducing a weight of the full submission queue based on determining the full completion queue exists,
   wherein the inhibiting includes adjusting a weight of the full submission queue to zero until the full submission queue becomes the normal completion queue, and
   wherein the inhibiting further includes increasing a weight of at least one normal submission queue among the plurality of submission queues, when the weight of the full submission queue is adjusted to zero.

2. The operating method as set forth in claim 1, wherein, each of the plurality of submission queues corresponds to a single submission head pointer, and
   the fetching includes fetching, from a memory of an external host device, a command of a position indicated by a selected submission head pointer corresponding to the selected submission queue.

3. The operating method as set forth in claim 1, wherein, each of a plurality of completion queues corresponding to the plurality of submission queues corresponds to a single completion tail pointer, and
   the outputting includes storing, in a memory of an external host device, the execution result in a position indicated by a selected completion tail pointer corresponding to the selected completion queue.

4. The operating method as set forth in claim 3, wherein, each of the plurality of completion queues corresponds to a single completion head pointer, and the method further comprises:
   determining whether the selected completion queue is the full completion queue or the normal completion queue, based on a selected completion head pointer corresponding to the selected completion queue and the selected completion tail pointer.

5. The operating method as set forth in claim 4, wherein the determining includes determining the selected completion queue to be the full completion queue when the selected completion head pointer and the selected completion tail pointer indicate adjacent addresses, respectively, and an address of the selected completion tail pointer is smaller than that of the selected completion head pointer.

6. The operating method as set forth in claim 4, wherein, each of the selected completion head pointer and the selected completion tail pointer indicates an address within a range defined by a smallest address and a largest address, and the determining includes determining the selected completion queue to be the full completion queue when the selected completion head pointer indicates the smallest address and the selected completion tail pointer indicates the largest address.

7. The operating method as set forth in claim 1, wherein, each of a plurality of completion queues corresponding to the plurality of submission queues corresponds to a single completion head pointer and a single completion tail pointer, and the at least one normal submission queue is selected based on the completion head pointer and the completion tail pointer.

8. The operating method as set forth in claim 7, wherein, the completion head pointer and the completion tail pointer indicate information on a number of execution results to be processed at a corresponding completion queue, and a submission queue corresponding to a completion queue with a smallest number of execution results to be processed among the plurality of completion queues is selected as the at least one normal submission queue.

9. The operating method as set forth in claim 1, wherein, each of the plurality of submission queues corresponds to a single submission head pointer and a single submission tail pointer, and the at least one normal submission queue is selected based on the submission head pointer and the submission tail pointer.

10. The operating method as set forth in claim 9, wherein, the submission head pointer and the submission tail pointer indicate information on a number of commands to be fetched from a corresponding submission queue, and a submission queue with a largest number of commands to be fetched among the plurality of submission queues is selected as the at least one normal submission queue.

11. An operating method of a storage device including a nonvolatile memory and a memory controller configured to control the nonvolatile memory, the operating method comprising:

fetching a command from a selected submission queue of a plurality of submission queues associated with the storage device;

executing the fetched command;

outputting an execution result of the fetched command to a selected completion queue corresponding to the selected submission queue when the selected completion queue is a normal completion queue; and performing a background operation when the selected completion queue is a full completion queue, wherein the background operation includes a garbage collection operation.

12. An operating method of a storage device, the storage device including a nonvolatile memory and a memory controller, the operating method comprising:

determining one or more completion queues, from among a plurality of completion queues, to be one or more full completion queues, the plurality of completion queues corresponding, respectively, to a plurality of submission queues, performing a selection operation including,
fetching, from one of one or more normal submission queues, a command for accessing the storage device, the one or more normal submission queues being from among the plurality of submission queues and not corresponding to any of the one or more full completion queues,
executing the fetched command, and
outputting an execution result of the fetched command to the completion queue corresponding to the normal submission queue from which the command was fetched;

preventing commands from being fetched from one or more full submission queues, the one or more full submission queues being from among the plurality of submission queues and corresponding to the one or more full completion queues, each of the plurality of submission queues being associated with a corresponding weight value, the performing the selection operation further including,
determining which submission queue, from among the plurality of submission queues, has a weight value with a highest level, and
selecting, as the normal submission queue from which the command is fetched, the determined submission queue, the preventing including reducing the one or more weight values corresponding, respectively, to the one or more full submission queues; and raising the weight value corresponding to a recovered submission queue, the recovered submission queue corresponding to a recovered completion queue, the recovered completion queue being from among the plurality of completion queues and having changed from being one of the one or more full completion queues to not being one of the one or more full completion queues.

13. The operating method of claim 12, further comprising:
performing the selection operation sequentially for each of the one or more normal queues, if the one or more normal queues include more than one of the plurality of submission queues.

14. The operating method of claim 12, wherein the nonvolatile memory comprises 3-dimensional memory array including a plurality of memory cells, each including a charge tram layer.

* * * * *